US010740854B1

(12) United States Patent
Eftekhari et al.

(10) Patent No.: US 10,740,854 B1
(45) Date of Patent: *Aug. 11, 2020

(54) WEB BROWSING AND MACHINE LEARNING SYSTEMS FOR ACQUIRING TAX DATA DURING ELECTRONIC TAX RETURN PREPARATION

(71) Applicant: INTUIT INC., Mountain View, CA (US)

(72) Inventors: Amir Eftekhari, San Diego, CA (US); Nankun Huang, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 999 days.

This patent is subject to a terminal disclaimer.

(21) Appl. No.: 14/925,633

(22) Filed: Oct. 28, 2015

(51) Int. Cl.
*G06Q 40/00* (2012.01)
*G06N 20/00* (2019.01)

(52) U.S. Cl.
CPC .......... *G06Q 40/123* (2013.12); *G06N 20/00* (2019.01)

(58) Field of Classification Search
CPC ..... G06Q 40/00; G06Q 40/123; G06N 99/005
See application file for complete search history.

(56) References Cited

U.S. PATENT DOCUMENTS

| 4,209,839 A | 6/1980 | Bedermen |
| 5,485,544 A | 1/1996 | Nonaka |
| 5,500,920 A | 3/1996 | Kupiec |
| 5,819,288 A | 10/1998 | De Bonet |
| 5,864,482 A | 1/1999 | Hazama |
| 5,884,283 A | 3/1999 | Manos |
| 6,021,397 A | 2/2000 | Jones et al. |
| 6,311,166 B1 | 10/2001 | Nado et al. |

(Continued)

FOREIGN PATENT DOCUMENTS

| JP | 2002-099613 | 4/2002 |
| KR | 10-2009-0089225 | 8/2009 |

(Continued)

OTHER PUBLICATIONS

Office Action dated Feb. 12, 2018 in U.S. Appl. No. 14/810,116, filed Jul. 27, 2015, (43pages).

(Continued)

*Primary Examiner* — Lalita M Hamilton
(74) *Attorney, Agent, or Firm* — DLA Piper LLP (US)

(57) ABSTRACT

A system for acquiring tax data during preparation of an electronic tax return includes a client computer executing a browser, a browser rendering computer in communication with the client computer, and a machine learning system utilized by the browser rendering computer. The client computer is configured to present a tax preparation webpage, and receive interface data representing s first user's interactions with a first tax data source website. The browser rendering computer is configured to execute the machine learning system, derive navigation information for the first tax data source website, generate rendering instructions for the first tax data source website, and transmit the rendering instructions to the client computer. The client computer is also configured to execute the rendering instructions to implement a second browser that presents a tax data source webpage that is controllable by a user independently of the tax preparation webpage.

36 Claims, 32 Drawing Sheets

(56) References Cited

U.S. PATENT DOCUMENTS

| | | |
|---|---|---|
| 6,401,080 B1 | 6/2002 | Bigus et al. |
| 6,473,741 B1 | 10/2002 | Baker |
| 6,691,116 B1 | 2/2004 | Bart |
| 6,718,336 B1 | 4/2004 | Saffer |
| 7,010,507 B1 | 3/2006 | Anderson et al. |
| 7,047,251 B2 | 5/2006 | Reed |
| 7,149,970 B1 | 12/2006 | Pratley et al. |
| 7,181,438 B1 | 2/2007 | Szabo |
| 7,254,554 B2 | 8/2007 | Tawara et al. |
| 7,289,956 B2 | 10/2007 | Yu et al. |
| 7,461,059 B2 | 12/2008 | Richardson et al. |
| 7,539,635 B1 | 5/2009 | Peak et al. |
| 7,565,312 B1 | 7/2009 | Shaw et al. |
| 7,584,093 B2 | 9/2009 | Potter et al. |
| 7,590,572 B2 | 9/2009 | Larson |
| 7,603,301 B1 | 10/2009 | Regan |
| 7,610,226 B1 | 10/2009 | Miller |
| 7,636,742 B1 | 12/2009 | Olavarrieta et al. |
| 7,668,763 B1 | 2/2010 | Albrecht |
| 7,680,756 B2 | 3/2010 | Quinn |
| 7,685,034 B1 | 3/2010 | Mori et al. |
| 7,685,082 B1 | 3/2010 | Coletta et al. |
| 7,693,769 B1 | 4/2010 | Burlison et al. |
| 7,712,023 B1 | 5/2010 | Bryan |
| 7,716,094 B1 | 5/2010 | Sutter |
| 7,716,099 B1 | 5/2010 | Welch et al. |
| 7,742,958 B1 | 6/2010 | Leek et al. |
| 7,747,484 B2 | 6/2010 | Stanley et al. |
| 7,756,761 B1 | 7/2010 | Albrecht |
| 7,756,855 B2 | 7/2010 | Ismalon |
| 7,769,647 B1 | 8/2010 | Char et al. |
| 7,778,895 B1 | 8/2010 | Baxter et al. |
| 7,788,195 B1 | 8/2010 | Subrannanian |
| 7,805,343 B1 | 9/2010 | Lyons et al. |
| 7,818,222 B2 | 10/2010 | Allanson et al. |
| 7,836,406 B1 | 11/2010 | Kirsten et al. |
| 7,848,971 B1 | 12/2010 | Mori et al. |
| 7,853,494 B2 | 12/2010 | Wyle |
| 7,860,763 B1 | 12/2010 | Quinn et al. |
| 7,860,774 B1 | 12/2010 | Peterson et al. |
| 7,870,491 B1 | 1/2011 | Henderson |
| 7,890,442 B2 | 2/2011 | Weir et al. |
| 7,904,356 B1 | 3/2011 | Cobarrubia |
| 7,912,767 B1 | 3/2011 | Cheatham et al. |
| 7,917,411 B1 | 3/2011 | Bedell |
| 7,917,412 B1 | 3/2011 | Wang |
| 7,930,226 B1 | 4/2011 | Quinn et al. |
| 7,984,004 B2 | 7/2011 | Andrew et al. |
| 8,001,006 B1 | 8/2011 | Yu et al. |
| 8,014,308 B2 | 9/2011 | Gates, III |
| 8,019,664 B1 | 9/2011 | Tifford et al. |
| 8,024,660 B1 | 9/2011 | Quinn |
| 8,050,988 B2 | 11/2011 | Kershner et al. |
| 8,095,476 B2 | 1/2012 | Bierner et al. |
| 8,099,329 B2 | 1/2012 | Paulsen |
| 8,108,258 B1 | 1/2012 | Slattery |
| 8,126,716 B2 | 2/2012 | Dhanakshirur |
| 8,126,787 B1 | 2/2012 | Leek et al. |
| 8,190,499 B1 | 5/2012 | McVickar |
| 8,204,805 B2 | 6/2012 | Eftekhari et al. |
| 8,326,754 B2 | 12/2012 | Bandych |
| 8,346,635 B1 | 1/2013 | Olim |
| 8,355,966 B1 | 1/2013 | Vu et al. |
| 8,407,113 B1 | 3/2013 | Eftekhari et al. |
| 8,417,596 B1 | 4/2013 | Dunbar et al. |
| 8,417,715 B1 | 4/2013 | Bruckhaus et al. |
| 8,418,920 B2 | 4/2013 | Lieberman et al. |
| 8,423,444 B1 | 4/2013 | Mackrell et al. |
| 8,429,184 B2 | 4/2013 | Ismon |
| 8,433,627 B2 | 4/2013 | Agee et al. |
| 8,447,667 B1 | 5/2013 | Dinamani et al. |
| 8,452,676 B1 | 5/2013 | Tan et al. |
| 8,468,110 B1 | 6/2013 | Podgorny |
| 8,504,582 B2 | 8/2013 | Soetarman |
| 8,527,375 B1 | 9/2013 | Olim |
| 8,583,517 B1 | 11/2013 | Ohme |
| 8,589,262 B1 | 11/2013 | Wang |
| 8,606,665 B1 | 12/2013 | Shaw |
| 8,635,127 B1 | 1/2014 | Shaw |
| 8,656,273 B1 | 2/2014 | Tifford et al. |
| 8,689,262 B2 | 4/2014 | Yamamura |
| 8,694,397 B2 | 4/2014 | Seubert et al. |
| 8,719,120 B1 | 5/2014 | McVickar et al. |
| 8,812,380 B2 | 8/2014 | Murray et al. |
| 8,857,713 B2 | 10/2014 | Lieberman et al. |
| 8,874,731 B1 | 10/2014 | Puppin |
| 8,903,810 B2 | 12/2014 | Ismon |
| 8,942,999 B1 | 1/2015 | Fernando et al. |
| 9,037,962 B1 | 5/2015 | Vassar et al. |
| 9,069,869 B1 | 6/2015 | Quinn et al. |
| 9,098,586 B1 | 8/2015 | Latif |
| 9,117,247 B2 | 8/2015 | Lieberman et al. |
| 9,153,141 B1 | 10/2015 | Kane, Jr. |
| 9,201,558 B1 | 12/2015 | Dingman |
| 9,280,252 B1 | 3/2016 | Brandmer et al. |
| 9,286,282 B2 | 3/2016 | Ling, III |
| 9,390,402 B1 | 7/2016 | Kane, Jr. |
| 9,406,089 B2 | 8/2016 | Mori et al. |
| 9,412,017 B1 | 8/2016 | Huang et al. |
| 9,444,824 B1 | 9/2016 | Balaz et al. |
| 9,690,854 B2 | 6/2017 | Stent |
| 9,734,136 B1 | 8/2017 | Mody et al. |
| 9,779,129 B1 | 10/2017 | Lequeux |
| 9,786,017 B1 | 10/2017 | Ohme et al. |
| 9,787,597 B1 | 10/2017 | Miller |
| 2002/0002546 A1 | 1/2002 | Doerr et al. |
| 2002/0015056 A1 | 2/2002 | Weinlaender |
| 2002/0052774 A1 | 5/2002 | Parker et al. |
| 2002/0093529 A1 | 7/2002 | Daoud |
| 2002/0111888 A1 | 8/2002 | Stanley et al. |
| 2002/0111890 A1 | 8/2002 | Sloan et al. |
| 2003/0050876 A1 | 3/2003 | Tawara et al. |
| 2003/0069882 A1 | 4/2003 | Nieswand et al. |
| 2003/0115259 A1 | 6/2003 | Narayanan |
| 2004/0078271 A1 | 4/2004 | Morano et al. |
| 2004/0254927 A1 | 12/2004 | Lang et al. |
| 2005/0027632 A1 | 2/2005 | Zeitoun et al. |
| 2005/0038722 A1 | 2/2005 | Throndson et al. |
| 2005/0043998 A1 | 2/2005 | Bross et al. |
| 2005/0054381 A1 | 3/2005 | Lee |
| 2005/0060174 A1 | 3/2005 | Heyward et al. |
| 2005/0144072 A1 | 6/2005 | Perkowski |
| 2005/0160103 A1 | 7/2005 | Raffo |
| 2005/0210024 A1 | 9/2005 | HurstHiller |
| 2005/0246234 A1 | 11/2005 | Munyon |
| 2005/0278221 A1 | 12/2005 | Hahn-Carlson et al. |
| 2005/0289023 A1 | 12/2005 | Hahn-Carlson et al. |
| 2005/0289024 A1 | 12/2005 | Hahn-Carlson et al. |
| 2006/0085304 A1 | 4/2006 | Buarque De Macedo et al. |
| 2006/0085306 A1 | 4/2006 | Schulte et al. |
| 2006/0122918 A1 | 6/2006 | Graboske et al. |
| 2006/0155632 A1 | 7/2006 | Cherkas et al. |
| 2006/0178961 A1 | 8/2006 | Stanley et al. |
| 2006/0184410 A1 | 8/2006 | Ramamurthy |
| 2006/0206454 A1 | 9/2006 | Forstl et al. |
| 2006/0287890 A1 | 12/2006 | Stead |
| 2007/0033116 A1 | 2/2007 | Murray |
| 2007/0033130 A1 | 2/2007 | Murray |
| 2007/0061128 A1 | 3/2007 | Odom |
| 2007/0136115 A1 | 6/2007 | Senturk et al. |
| 2007/0250418 A1 | 10/2007 | Banks et al. |
| 2008/0027895 A1 | 1/2008 | Combaz |
| 2008/0027979 A1 | 1/2008 | Chandrasekar et al. |
| 2008/0059900 A1 | 3/2008 | Murray et al. |
| 2008/0065617 A1 | 3/2008 | Burke et al. |
| 2008/0104045 A1 | 5/2008 | Cohen |
| 2008/0119134 A1 | 5/2008 | Rao |
| 2008/0147494 A1 | 6/2008 | Larson |
| 2008/0189197 A1 | 8/2008 | Ianson et al. |
| 2008/0189757 A1 | 8/2008 | Schackow et al. |
| 2008/0196098 A1 | 8/2008 | Cottrell |
| 2008/0201206 A1 | 8/2008 | Pokorney |
| 2008/0263643 A1 | 10/2008 | Jaiswal |
| 2008/0288304 A1 | 11/2008 | Nores |

(56) References Cited

U.S. PATENT DOCUMENTS

| | | |
|---|---|---|
| 2009/0012884 A1 | 1/2009 | Harman et al. |
| 2009/0031042 A1 | 1/2009 | Phatak |
| 2009/0076335 A1 | 3/2009 | Schwarzberg et al. |
| 2009/0099959 A1 | 4/2009 | Liao |
| 2009/0234684 A1 | 9/2009 | Stoke et al. |
| 2009/0276374 A1 | 11/2009 | Viner |
| 2009/0307159 A1 | 12/2009 | Pinckney et al. |
| 2010/0010849 A1 | 1/2010 | Hurd |
| 2010/0017348 A1 | 1/2010 | Pinckney et al. |
| 2010/0023934 A1 | 1/2010 | Sheehan et al. |
| 2010/0146523 A1 | 6/2010 | Brigaut et al. |
| 2010/0251305 A1 | 9/2010 | Kimble et al. |
| 2010/0262495 A1 | 10/2010 | Dumon et al. |
| 2010/0274606 A1 | 10/2010 | Fain et al. |
| 2010/0312724 A1 | 12/2010 | Pinckney et al. |
| 2010/0332362 A1 | 12/2010 | Ramsey et al. |
| 2011/0004537 A1 | 1/2011 | Ianson et al. |
| 2011/0022502 A1 | 1/2011 | Evans |
| 2011/0066602 A1 | 3/2011 | Studer |
| 2011/0078066 A1 | 3/2011 | Sherman et al. |
| 2011/0119264 A1 | 5/2011 | Hu et al. |
| 2011/0137776 A1 | 6/2011 | Goad et al. |
| 2011/0173222 A1 | 7/2011 | Sayal |
| 2011/0258195 A1 | 10/2011 | Welling et al. |
| 2011/0264569 A1 | 10/2011 | Houseworth et al. |
| 2011/0264570 A1 | 10/2011 | Houseworth |
| 2012/0030159 A1 | 2/2012 | Pilaszy et al. |
| 2012/0030767 A1 | 2/2012 | Rippert, Jr. |
| 2012/0053965 A1 | 3/2012 | Hellman et al. |
| 2012/0084185 A1 | 4/2012 | Ciaramitaro et al. |
| 2012/0109792 A1* | 5/2012 | Eftekhari ............... G06F 21/31 705/31 |
| 2012/0136764 A1 | 5/2012 | Miller et al. |
| 2012/0211561 A1 | 8/2012 | Lieberman et al. |
| 2012/0215669 A1* | 8/2012 | Lieberman ........... G06Q 40/123 705/31 |
| 2012/0278179 A1 | 11/2012 | Ray et al. |
| 2012/0303495 A1 | 11/2012 | Murray |
| 2012/0324393 A1 | 12/2012 | Mbenkum |
| 2013/0080302 A1 | 3/2013 | Ianson et al. |
| 2013/0091050 A1 | 4/2013 | Merrill |
| 2013/0124644 A1 | 5/2013 | Hunt et al. |
| 2013/0198047 A1 | 8/2013 | Houseworth et al. |
| 2013/0198287 A1 | 8/2013 | Raz |
| 2013/0254151 A1 | 9/2013 | Mohagheghi et al. |
| 2013/0282539 A1 | 10/2013 | Murray |
| 2013/0282733 A1 | 10/2013 | Tawakol |
| 2013/0290200 A1 | 10/2013 | Singh |
| 2014/0027509 A1 | 1/2014 | Lieberman et al. |
| 2014/0032259 A1 | 1/2014 | LaFever |
| 2014/0068413 A1 | 3/2014 | Christensen |
| 2014/0101571 A1 | 4/2014 | Lewis |
| 2014/0114822 A1* | 4/2014 | Sharma ................. G06Q 40/12 705/31 |
| 2014/0156566 A1 | 6/2014 | Kabiljo et al. |
| 2014/0172656 A1 | 6/2014 | Shaw |
| 2014/0180883 A1 | 6/2014 | Regan |
| 2014/0201045 A1 | 7/2014 | Pai et al. |
| 2014/0201108 A1 | 7/2014 | Chapman |
| 2014/0214636 A1 | 7/2014 | Rajsky |
| 2014/0222702 A1 | 8/2014 | Jennings |
| 2014/0244455 A1 | 8/2014 | Huang et al. |
| 2014/0244456 A1 | 8/2014 | Huang et al. |
| 2014/0248063 A1 | 9/2014 | Chourasia |
| 2014/0279190 A1 | 9/2014 | Severinghaus et al. |
| 2014/0314225 A1 | 10/2014 | Riahi et al. |
| 2014/0324648 A1 | 10/2014 | Mori et al. |
| 2014/0325664 A1 | 10/2014 | Nekhoroshev |
| 2014/0337189 A1 | 11/2014 | Barsade et al. |
| 2014/0337753 A1 | 11/2014 | McKellar et al. |
| 2015/0007065 A1 | 1/2015 | Krishnamoorthy |
| 2015/0026146 A1 | 1/2015 | Mance |
| 2015/0081470 A1 | 3/2015 | Westphal |
| 2015/0101599 A1 | 4/2015 | Berry |
| 2015/0149877 A1 | 5/2015 | Ling, III |
| 2015/0178371 A1 | 6/2015 | Seth |
| 2015/0332167 A1 | 11/2015 | Kaush et al. |
| 2015/0363875 A1 | 12/2015 | Guerry |
| 2015/0379631 A1 | 12/2015 | Singh |
| 2016/0034853 A1 | 2/2016 | Wang |
| 2016/0180248 A1 | 2/2016 | Regan |
| 2016/0071112 A1 | 3/2016 | Unser |
| 2016/0078567 A1 | 3/2016 | Goldman et al. |
| 2016/0098804 A1 | 4/2016 | Mascaro et al. |
| 2016/0125552 A1 | 5/2016 | Pathak et al. |
| 2016/0148322 A1 | 5/2016 | Mascaro et al. |
| 2016/0180470 A1 | 6/2016 | Mascaro et al. |
| 2016/0217533 A1 | 7/2016 | Laaser |
| 2016/0217534 A1 | 7/2016 | Goldman et al. |
| 2016/0246762 A1 | 8/2016 | Eaton |
| 2016/0247239 A1 | 8/2016 | Houseworth et al. |
| 2016/0275627 A1 | 9/2016 | Wang et al. |
| 2016/0328804 A1 | 11/2016 | Mori et al. |
| 2016/0328805 A1 | 11/2016 | Mori et al. |
| 2016/0328806 A1 | 11/2016 | Mori et al. |
| 2017/0004585 A1 | 1/2017 | Dang et al. |
| 2017/0104841 A1* | 4/2017 | Duke ................. G06F 17/30424 |

FOREIGN PATENT DOCUMENTS

| | | |
|---|---|---|
| KR | 10-2013-0027811 | 3/2013 |
| WO | WO 2004/008367 | 1/2004 |

OTHER PUBLICATIONS https://www.puffinbrowser.com/index.php), Jul. 27, 2015 (5pages).
U.S. Appl. No. 14/810,116, filed Jul. 27, 2015, Inventor: Amir Eftekhari et al., (unpublished).
U.S. Appl. No. 14/871,366, filed Sep. 30, 2015, Inventor: Amir Eftekhari et al., (unpublished).
U.S. Appl. No. 15/164,777, filed May 25, 2016, Inventor: Paul F. Hubbard et al., (unpublished).
U.S. Appl. No. 14/871,802, filed Sep. 30, 2015, Inventor: Amir Eftekhari et al., (unpublished).
web.archive.org/web/20100919125845/http://cpaclass.conn/tax-accounting/tax-law/internal-revenue-code/26-usc-section/196.htnn, CPA class, U.S. Tax Laws Internal Revenue Code, Sep. 19, 2010 (Year: 2010).
http://en.wikipedia.org/wiki/Artificial_neural_network, printed Oct. 27, 2014 (22 pages).
http://en.wikipedia.org/wiki/Generalized_linear_model, printed Oct. 27, 2014 (13 pages).
http://en.wikipedia.org/wiki/Gradient_boosting, printed Oct. 27, 2014 (8 pages).
http://en.wikipedia.org/wiki/K-d_tree, printed Oct. 27, 2014 (10 pages).
http://en.wikipedia.org/wiki/K-nearest_neighbors_algorithm, printed Oct. 27, 2014 (10 pages).
http://en.wikipedia.org/wiki/Logistic_regression, printed Oct. 27, 2014 (28 pages).
http://en.wikipedia.org/wiki/Naive_Bayes_classifier, printed Oct. 27, 2014 (14 pages).
http://en.wikipedia.org/wiki/Predictive_analytics, printed Oct. 27, 2014 (18 pages).
http://en.wikipedia.org/wiki/Predictive_modelling, printed Oct. 27, 2014 (8 pages).
http://en.wikipedia.org/wiki/Random_forest, printed Oct. 27, 2014 (7 pages).
http://en.wikipedia.org/wiki/Support_vector_machine, printed Oct. 27, 2014 (16 pages).
http://www.gartner.com/it-glossary/predictive-modeling, printed Oct. 27, 2014 (1 page).
http://www.ibm.com/developerworks/library/ba-predictive-analytics2/, printed Oct. 27, 2014 (8 pages).
PCT International Search Report for PCT/US2014/056516 dated Jun. 18, 2015 (5pages).
PCT Written Opinion of the International Search Authority for PCT/US2014/056516 dated Jun. 18, 2015 (9pages).

(56) References Cited

OTHER PUBLICATIONS

Australian Office Action dated Nov. 8, 2018 issued in Australian Application No. 20144058856.
Canadian Office Action dated Nov. 22, 2018 issued in Canadian Application No. 2,960,788.
"Modular Programming," Wikipedia, the free encyclopedia, Jul. 29, 2014, http://en.wikipedia.org/w/index.php?title=Modular_programming&oldid=618953117, retrieved from the Internet on Mar. 31, 2015, 4 pages.
Anders, B. Susan; "Website of the Month: MSN Money Tax Center," Apr. 2013, The CPA Journal, pp. 72-73.
Forsati, R.; "Web Page Personalization Based on Weighted Association Rules," 2009 International Conference on Electronic Computer Technology, pp. 130-135.
http://en.wikipedia.org/wiki/Declarative_programming, printed Oct. 27, 2014 (4 pages).
http://en.wikipedia.org/wiki/Imperative_programming, printed Oct. 27, 2014 (4 pages).
http://vwvw.forbes.com/sites/danwoods/2013/04/171why-adopting-the-declarative-programming-practices-will-improve-your-return-from-technology/, printed Oct. 27, 2014 (8 pages).
Publication 559: Final Income Tax Return for Decedent—Form 1040, p. 2, paragraph 2; https://taxmap.ntis.gov/taxmap/pub/p559-001.htm; retrieved from the Internet Jul. 11, 2017.
Zhang, Zhenya, et al.; "Enabling Personalization Recommendation with WeightedFP for Text Information Retrieval Based on User-Focus," Proceedings of the International Conference on Information Technology: Coding and Computing (ITCC'04), 5 pp.
"QuickBooks® Assessing the Health of the Data File and Troubleshooting", The Sleeter Group, Aug. 2005 (71 pages).
U.S. Appl. No. 14/530,305, filed Oct. 31, 2014.
U.S. Appl. No. 14/530,369, filed Oct. 31, 2014.
U.S. Appl. No. 14/607,935, filed Jan. 28, 2015.
U.S. Appl. No. 12/475,767, filed Jun. 1, 2009.
U.S. Appl. No. 11/413,308, filed Apr. 28, 2006.
U.S. Appl. No. 14/674,582, filed Mar. 31, 2015.
U.S. Appl. No. 15/164,777, filed May 25, 2016.
U.S. Appl. No. 16/524,825, filed Jul. 29, 2019.
U.S. Appl. No. 16/295,417, filed Mar. 7, 2019.
U.S. Appl. No. 11/413,308, filed Apr. 28, 2006, Issued.
U.S. Appl. No. 12/475,767, filed Jun. 1, 2009, Abandoned.
U.S. Appl. No. 14/530,305, filed Oct. 31, 2014, Issued.
U.S. Appl. No. 14/530,369, filed Oct. 31, 2014, Issued.
U.S. Appl. No. 14/607,935, filed Jan. 28, 2015, Abandoned.
U.S. Appl. No. 14/484,119, filed Sep. 11, 2014, Pending.
U.S. Appl. No. 14/698,683, filed Apr. 28, 2015, Pending.
U.S. Appl. No. 14/674,582, filed Mar. 31, 2015, Abandoned.
U.S. Appl. No. 15/164,777, filed May 25, 2016, Issued.
U.S. Appl. No. 15/363,681, filed Nov. 29, 2016, Pending.
U.S. Appl. No. 16/295,417, filed Mar. 7, 2019, Pending.
U.S. Appl. No. 16/524,825, filed Jul. 29, 2019, Pending.
U.S. Appl. No. 14/871,366, filed Sep. 30, 2015, Pending.
U.S. Appl. No. 14/698,683, filed Apr. 28, 2015.
U.S. Appl. No. 14/871,366, filed Sep. 30, 2015.
https://en.wikipedia.org/wiki/proxy_server, Sep. 3, 2011 (3 pages).
U.S. Appl. No. 15/363,681, filed Nov. 29, 2016.
U.S. Appl. No. 14/484,119, filed Sep. 11, 2014.

\* cited by examiner

FIG. 24

WEB BROWSING AND MACHINE LEARNING SYSTEMS FOR ACQUIRING TAX DATA DURING ELECTRONIC TAX RETURN PREPARATION

SUMMARY

Embodiments are directed to web browsing systems for acquiring tax data during electronic tax return preparation.

In one embodiment directed to a system for acquiring tax data during preparation of an electronic tax return, the system includes a client computer executing a browser. The client computer is configured to present a tax preparation webpage of a tax preparation application utilized to prepare the electronic tax return, and receive interface data from a first user for a first tax data source website of a tax data source program hosted by a tax data source computer. The interface data represents the first user's interactions with the first tax data source website. The system also includes a browser rendering computer in communication with the client computer. The system further includes a machine learning system utilized by the browser rendering computer. The browser rendering computer is configured to: (1) receive the interface data from the client computer; (2) execute the machine learning system utilizing the received interface data as an input; (3) derive navigation information for the first tax data source website based at least in part upon a result generated by the machine learning system; (4) generate rendering instructions for the first tax data source website; and (5) transmit the rendering instructions to the client computer. The client computer is also configured to execute the rendering instructions to implement a second browser that presents a tax data source webpage based at least in part upon the rendering instructions and the interface data. The tax data source webpage is controllable by a user independently of the tax preparation webpage.

In another embodiment directed to a method of acquiring tax data using a computerized system including a client computer executing a browser, a browser rendering computer in communication with the client computer, and a machine learning system utilized by the browser rendering computer, the method includes the client computer presenting a tax preparation webpage of a tax preparation application utilized to prepare the electronic tax return. The method also includes the client computer receiving interface data from a first user for a first tax data source website of a tax data source program hosted by a tax data source computer. The interface data represents the first user's interactions with the first tax data source website. The method further includes the browser rendering computer receiving the interface data from the client computer. Moreover, the method includes the browser rendering computer executing the machine learning system utilizing the received interface data as an input. In addition, the method includes the browser rendering computer deriving navigation information for the first tax data source website based at least in part upon a result generated by the machine learning system. The method also includes the browser rendering computer generating rendering instructions for the first tax data source website, and transmitting the rendering instructions to the client computer. The method further includes the client computer executing the rendering instructions to implement a second browser that presents a tax data source webpage based at least in part upon the rendering instructions and the interface data. The tax data source webpage is controllable by a user independently of the tax preparation webpage.

In one or more embodiments, the interface data is selected from the group consisting of mouse clicks, keyboard events, form submissions, and page navigations.

In one or more embodiments, the machine learning system includes an action recorder and a navigation sequence detector. The action recorder may be configured to read and store the interface data. The navigation sequence detector may be configured to analyze the interface data to derive the navigation information for the first tax data source website. The action recorder may also be configured to filter out a non-relevant event. The non-relevant event may be selected from the group consisting of mouse clicks on non-link elements and scrolling events.

In one or more embodiments, the action recorder is also configured to read and store respective interface data from a plurality of users on the first tax data source website. The navigation sequence detector may also be configured to analyze the respective interface data to derive the navigation information for the first tax data source website. Analyzing the respective interface data may include generalizing the respective interface data. Analyzing the respective interface data may include analyzing states of respective tax data source webpages of the first tax data source website resulting from applying the respective interface data to the first tax data source website.

In one or more embodiments, the navigation sequence detector includes a branch detector. The branch detector may be configured to analyze first and second tax data source webpages of the first tax data source website, where the first and second tax data source webpages have different configurations but respective interactions on the first and second tax data source webpages result in respective first and second result webpages having the same state.

In one or more embodiments, the learning system also includes a target classification engine and a playback engine. The target classification engine may be configured to determine whether a second tax data source website is substantially similar to the first tax data source website. The playback engine may be configured to interact with the second tax data source website using the navigation information and user information provided by a second user. The target classification engine may also be configured to convert each of the first and second tax data source websites to respective first and second tree structures, and to perform an edit-distance computation on the first and second tree structures to determine whether the first and second tax data source websites are substantially similar to each other. The target classification engine may also be configured to categorize the first and second tax data source websites as substantially similar when the edit-distance computation outputs a difference parameter greater than a predetermined difference parameter. The playback engine may also be configured to enter the user information into a second field in the second tax data source website using the navigation information, where the second field in the second tax data source website corresponds to a first field in the first tax data source website.

In one or more embodiments, the machine learning system also includes a parameter detector configured to parameterize a field on the second tax data source website before the playback engine interacts with the second tax data source website. Parameterizing the field on the second tax data source website may include determining that the field includes a parameter. The parameter may be selected from the group consisting of an HTTP POST request and an onblur event. Parameterizing the field on the second tax data source website may also include capturing the parameter.

Parameterizing the field on the second tax data source website may also include removing the parameter from the second tax data source website before the playback engine interacts with the second tax data source website.

In one or more embodiments, the machine learning system includes an action recorder and a navigation sequence detector. The method also includes the action recorder reading and storing the interface data. The method further includes the navigation sequence detector analyzing the interface data and deriving the navigation information for the first tax data source website.

In one or more embodiments, the method also includes the action recorder filtering out a non-relevant event. The non-relevant event may be selected from the group consisting of mouse clicks on non-link elements and scrolling events.

In one or more embodiments, the method also includes the action recorder reading and storing respective interface data from a plurality of users on the first tax data source website.

In one or more embodiments, the method also includes the navigation sequence detector analyzing the respective interface data and deriving the navigation information for the first tax data source website.

In one or more embodiments, the navigation sequence detector includes a branch detector. The method may also include the branch detector analyzing first and second tax data source webpages of the first tax data source website, wherein the first and second tax data source webpages have different configurations but respective interactions on the first and second tax data source webpages result in respective first and second result webpages having the same state.

In one or more embodiments, the machine learning system also includes a target classification engine and a playback engine. The method may also include the target classification engine determining whether a second tax data source website is substantially similar to the first tax data source website. The method may further include the playback engine interacting with the second tax data source website using the navigation information and user information provided by a second user.

In one or more embodiments, the method also includes the target classification engine converting each of the first and second tax data source websites to respective first and second tree structures, and performing an edit-distance computation on the first and second tree structures to determine whether the first and second tax data source websites are substantially similar to each other. The method may also include the target classification engine categorizing the first and second tax data source websites as substantially similar when the edit-distance computation outputs a difference parameter greater than a predetermined difference parameter.

In one or more embodiments, the method also includes the playback engine entering the user information into a second field in the second tax data source website using the navigation information, wherein the second field in the second tax data source website corresponds to a first field in the first tax data source website.

In one or more embodiments, the machine learning system also includes a parameter detector. The method also includes the parameter detector parameterizing a field on the second tax data source website before the playback engine interacts with the second tax data source website.

BRIEF DESCRIPTION OF THE DRAWINGS

The foregoing and other aspects of embodiments are described in further detail with reference to the accompanying drawings, in which the same elements in different figures are referred to by common reference numerals, wherein:

FIGS. 17 to 25 are exemplary screen shots of a tax data acquisition system according to one embodiment.

Figure 1:
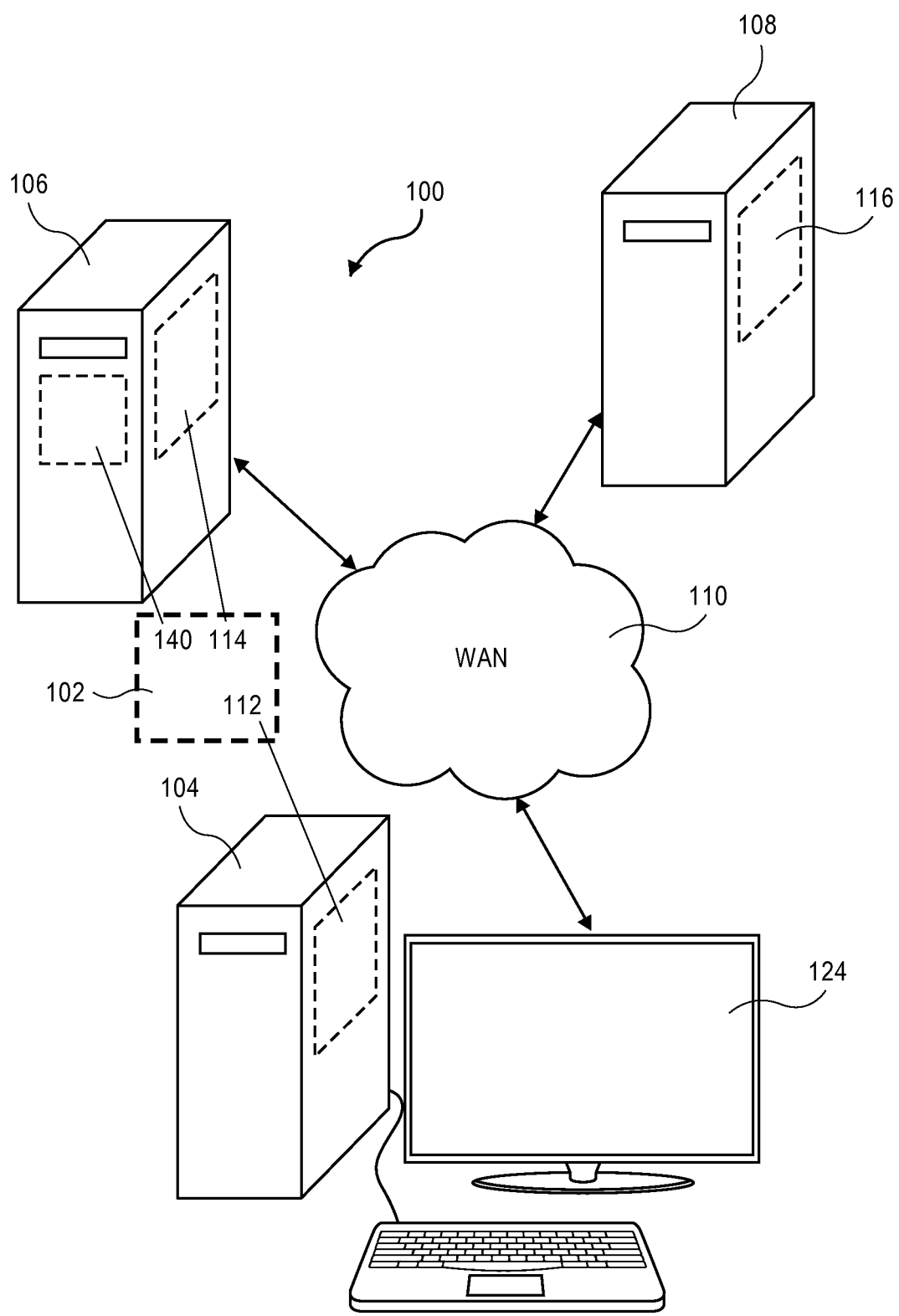
FIGS. 1 to 4 are schematic diagrams illustrating the implementation of tax data acquisition systems on computing devices according to various embodiments.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

During preparation of tax returns, tax data must be acquired to complete the tax return. While tax data can be entered manually by a user/preparer, many electronic tax return preparation systems can acquire tax data automatically (without human intervention after authorization) or semi-automatically (with minimal human intervention—e.g., provision of financial account authentication information) from third party websites hosted on third party computers through a network, such as the Internet.

Tax return preparation can be performed by the taxpayer or a tax professional using an electronic tax return preparation program. Regardless of who prepares the tax return, the tax return preparation process is often paused or halted one or more times for the user to acquire tax data needed to complete the tax return. These disruptions in the tax return preparation process are opportunities for the user to walk away from the process, which can lead to errors related to restarting the process or unfinished tax returns.

Tax data is typically found on paper or electronic documents, which may not be immediately available to the user. Therefore, manually acquiring tax data for tax return preparation may include searching for paper documents, or accessing electronic documents or information from a third party website ("tax data websites"; e.g., payroll processor websites for W-2 information, banking account websites for 1099-INT information, brokerage account websites for 1099-DIV information, property tax authorities, etc.) hosted on a third party computer.

While preparing a tax returning using an online electronic tax return preparation system, tax data from third party websites can be entered manually by the user, automatically, or semi-automatically. Manual data entry typically involves opening a new browser in a new window or a new tab. Tax data obtained from the new browser (e.g., data or electronic documents) must then be manually entered or uploaded into the online electronic tax return preparation system. While this manual process can successfully acquire tax data, it introduces opportunities for user error, and it can frustrate users who must switch between software experiences.

Alternative to manual tax data entry include automatic and semi-automatic tax data acquisition. Traditionally, acquiring tax data from third party websites through networks has been automated (including automatic and semi-automatic tax data acquisition) using one of two solutions: Application Programming Interface ("API") connection to a third party computer through a network; and screen scraping of third party webpages accessed through a network. While an API connection can be used to collect tax data from a third party website through a network, this solution requires manual integration by programmers on both the ends of the network connection, including manual selection of a data interchange format. While screen scraping of third party webpages can be used to collect tax data from a third party website through a network, this solution requires the screen scraping system to have information regarding the layout of the third party website and webpage. This requirement presents a problem specific to computer systems and, more particularly, to Internet access between computer systems.

Embodiments described in this application are directed to tax data acquisition systems for automating the tax data acquisition process, from portions to the entirety thereof.

In particular, an exemplary tax data acquisition system includes a client computer, a browser rendering computer connected by a network, and a machine learning system. The tax data acquisition system is configured to automatically or semi-automatically acquire tax data from a third party tax data source computer. The tax data acquisition system also includes a machine learning system communicatively coupled to and utilized by the browser rendering computer. Further, the tax data acquisition system is connected by a network to a third party computer hosting a third party website including tax data.

The tax data acquisition system (i.e., the client computer and the browser rendering computer) is configured to present a tax preparation webpage of a tax preparation program and a secondary webpage that emulates the third party webpage. Presenting tax preparation and secondary webpages may include instantiating, rendering or displaying the webpages. The tax data acquisition system is also configured to receive tax data through the secondary webpage, and to send the received tax data to the electronic tax preparation program, after receiving authorization to do so. Tax data acquisition systems having a tax preparation webpage and a secondary webpage are described in U.S. patent application Ser. No. 14/810,116, filed Jul. 27, 2015, entitled "WEB BROWSING SYSTEMS FOR ACQUIRING TAX DATA DURING ELECTRONIC TAX RETURN PREPARATION," the contents of which are fully incorporated herein by reference as though set forth in full.

The machine learning system is configured to (1) derive navigation information for an unknown website and (2) identify a known website and interact with the known website using previously derived navigation information and previously acquired user information. Adding this machine learning system to the tax data acquisition system facilitates utilizing user interactions with unknown third party websites to derive navigation information for those unknown third party websites. The machine learning system also facilitates automatic navigation of known third party websites and acquisition of tax data therefrom. The described embodiments improve the efficiency of automatic tax data acquisition. The described embodiments also improve another technical field of machine learning.

In one specific embodiment, the secondary webpage is rendered in the tax preparation webpage. The secondary webpage may be rendered in a modal window such that the tax preparation webpage remains open, but is inaccessible, until the modal secondary webpage is closed. The browser may also be sandboxed on the client computer to limit access to resources thereon.

As used in this application, a "preparer," "user" or "taxpayer" includes, but is not limited to, a person preparing a tax return using tax return preparation software. The "preparer," "user" or "taxpayer" may or may not be obligated to file the tax return. As used in this application, a "previous tax return" or "prior tax return" includes, but is not limited to, a tax return (in electronic or hard copy form) for a year before the current tax year. As used in this application, "tax data" includes, but is not limited to, information that may affect a user's income tax burden, including information typically included in a tax return. The term "tax data," as used in this application, also includes, but is not limited to, partially or fully completed tax forms (electronic and hard copy) that include information typically included in a tax return.

As used in this application, "computer," "computer device" and "computing device" include, but are not limited to, a computer (laptop or desktop) and a computer or computing device of a mobile communication device, smartphone and tablet computing device such as an IPAD (available from Apple Inc. of Cupertino, Calif.). As used in this application, "tax preparation system," "tax preparation computing device," "tax preparation computer," "tax preparation software," "tax preparation module," "tax preparation application," "tax preparation program," "tax return preparation system," "tax return preparation computing device," "tax return preparation computer," "tax return preparation software," "tax return preparation module," "tax return preparation application," or "tax return preparation program" include, but are not limited to, one or more separate and independent software and/or hardware components of a computer that must be added to a general purpose computer before the computer can prepare tax returns, and computers having such components added thereto.

As used in this application, "client computer" includes, but is not limited to, one or more separate and independent software and/or hardware components of a computer that must be added to a general purpose computer before the computer can send tax data, obtained from a data source computer, to a rendering computer, and computers having such components added thereto. As used in this application, "browser rendering computer" includes, but is not limited to, one or more separate and independent software and/or hardware components of a computer that must be added to a general purpose computer before the computer can acquire tax data using a client computer or a plurality of client computers, and computers having such components added thereto.

As used in this application, "input/output module" includes, but is not limited to, one or more separate and independent software and/or hardware components of a computer that must be added to a general purpose computer before the computer can communicate with and facilitate the receipt and transfer of information, including interface and tax data, from and to other computers for tax data acquisition. As used in this application, "memory module" includes, but is not limited to, one or more separate and independent software and/or hardware components of a computer that must be added to a general purpose computer before the computer can store information, including interface and tax data, in proper formats for tax data acquisition.

As used in this application, "user interface controller" includes, but is not limited to, one or more separate and independent software and/or hardware components of a computer that must be added to a general purpose computer before the computer can control a user interface for tax data acquisition. As used in this application, "rendering instruction generator" includes, but is not limited to, one or more separate and independent software and/or hardware components of a computer that must be added to a general purpose computer before the computer can process interface data to generate rendering instructions (e.g., for a display).

As used in this application, "website" includes, but is not limited to, one or more operatively coupled webpages. As used in this application, "machine learning system" includes, but is not limited to, one or more separate and independent software and/or hardware components of a computer that must be added to a general purpose computer before the computer can derive and utilize website navigation information, and computers having such components added thereto. As used in this application, "action recorder" includes, but is not limited to, one or more separate and independent software and/or hardware components of a computer that must be added to a general purpose computer before the computer can read and store user interactions on a website. As used in this application, "navigation sequence detector" includes, but is not limited to, one or more separate and independent software and/or hardware components of a computer that must be added to a general purpose computer before the computer can analyze user website interactions to derive navigation information the website. As used in this application, "target classification engine" includes, but is not limited to, one or more separate and independent software and/or hardware components of a computer that must be added to a general purpose computer before the computer can determine whether two websites are substantially similar to each other. As used in this application, two websites being "substantially similar" includes, but is not limited to, first and second websites having structures such that navigation information for the first website can be used to navigate the second website without triggering an error. As used in this application, "parameter detector" includes, but is not limited to, one or more separate and independent software and/or hardware components of a computer that must be added to a general purpose computer before the computer can parameterize a website field. As used in this application, "playback engine" includes, but is not limited to, one or more separate and independent software and/or hardware components of a computer that must be added to a general purpose computer before the computer can interact with a website using previously derived navigation information and previously obtained user information.

FIG. 1 depicts an exemplary hardware system 100 on which a tax data acquisition system 102 according to one embodiment may be executed. The hardware system 100 according to this embodiment includes a client computer 104, a remote browser rendering computer 106, and a third party computer 108, all connected via a network 110 (e.g., a WAN network). The tax data acquisition system 102 includes a user interface 112 running on the client computer 104, and a web engine 114 and a machine learning system 140 running on the browser rendering computer 106. The user interface 112 and the web engine 114 communicate with each other through the network 110. The machine learning system 140 can communicate with the user web engine 114 (e.g., through a bus—not shown) and/or the user interface 112 (through a network 110). The third party computer 108 ("tax data source computer") hosts a tax data source program 116, which communicates with the user interface 112 and/or the web engine 114 through the network 110. Examples of tax data source programs 116 include, but are not limited to, those associated with payroll processors, bank accounts, investment accounts, and tax collection authorities. The network 110 may include a wide area network, such as the Internet. The network 110 may also include a private communication network 110, such as a cellular data network.

Figure 2:
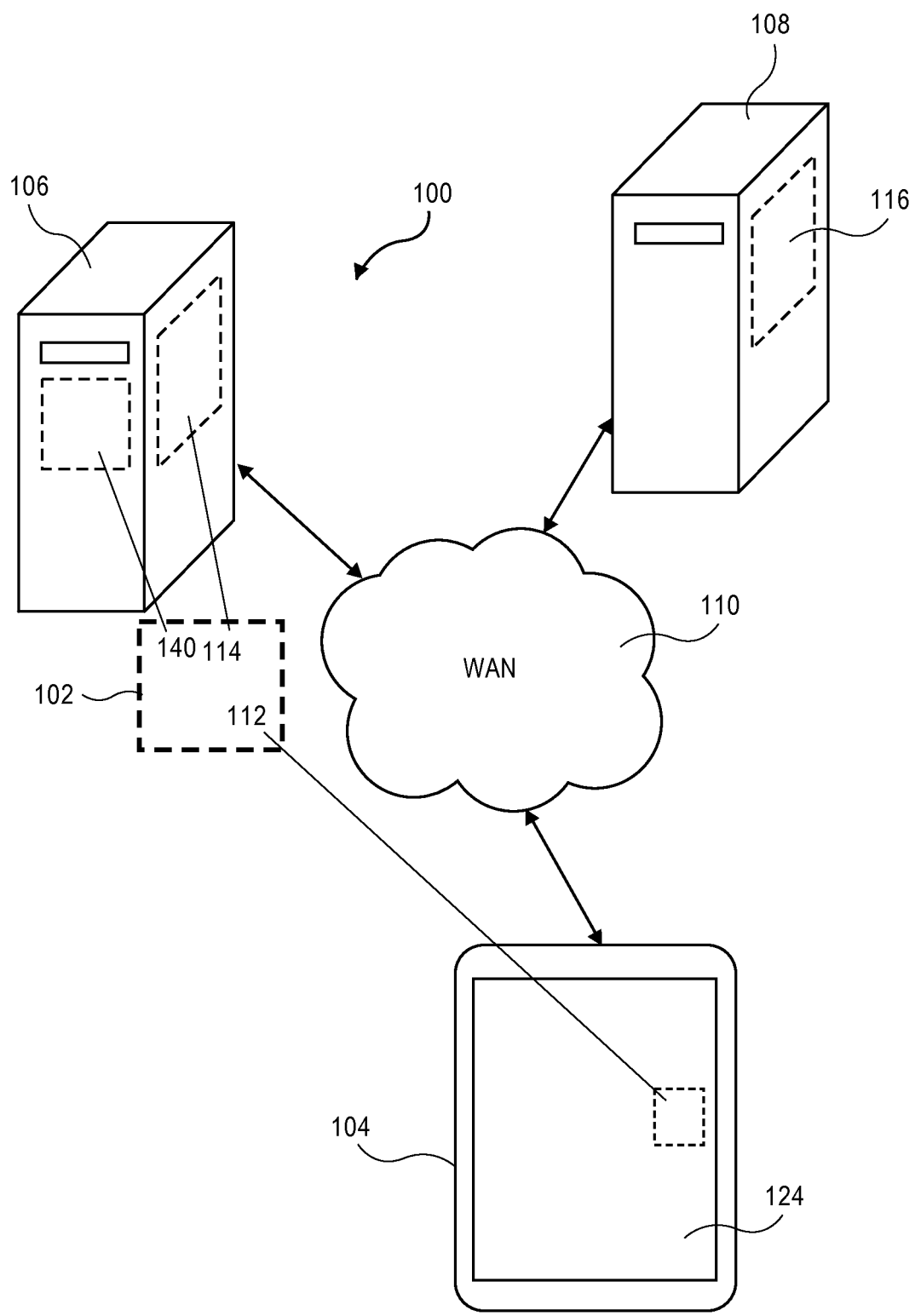

While FIG. 1 depicts the web engine 114 and the machine learning system 140 as running on the same browser rendering computer 106, the web engine 114 and the machine learning system 140 can run on different computers in other embodiments. While FIG. 1 depicts the client computer 104 as a desktop computer, the client computer 104 can be any computing device, including a laptop computer or a computing device of a mobile communication device, smartphone or tablet computing device, as shown in FIG. 2. Embodiments in which the client computer 104 is a mobile communication device, smartphone or tablet computing device, the user interface 112 may be part of an application or a plug-in, such as a JAVA plug-in or a CHROME extension.

Figure 3:
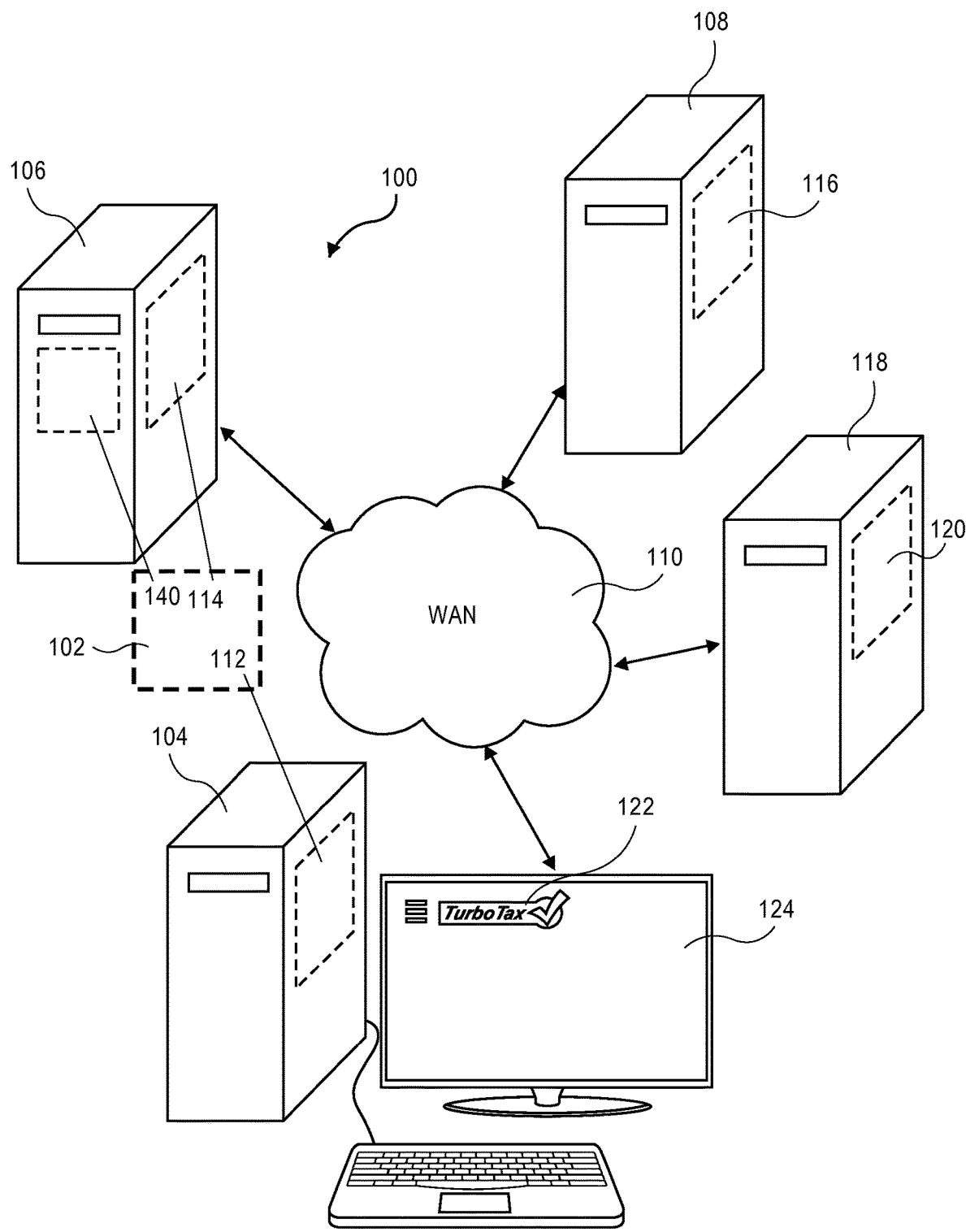

FIG. 3 depicts another exemplary hardware system 100 on which a tax data acquisition system 102 according to another embodiment may be executed. The hardware system 100 according to this embodiment includes a client computer 104, a remote browser rendering computer 106, a third party computer 108, and a tax return preparation computer 118, all connected via a network 110 (e.g., a WAN network). The tax data acquisition system 102 includes a user interface 112 running on the client computer 104, and a web engine 114 and a machine learning system 140 running on the browser rendering computer 106. The user interface 112 and the web engine 114 communicate with each other through the network 110. The machine learning system 140 can communicate with the user web engine 114 (e.g., through a bus—not shown) and/or the user interface 112 (through a network 110). The third party computer 108 ("tax data source computer") hosts a tax data source program 116, which communicates with the user interface 112 and/or the web engine 114 through the network 110. The tax return preparation computer 118 hosts a tax return preparation program 120, which communicates with the user interface 112 and/or the web engine 114 through the network 110. The tax return preparation program 120 is accessed via a tax return preparation web browser 122 on the client computer 104. The network 110 may include a wide area network, such as the Internet. The network 110 may also include a private communication network 110, such as a cellular data network.

Figure 4:
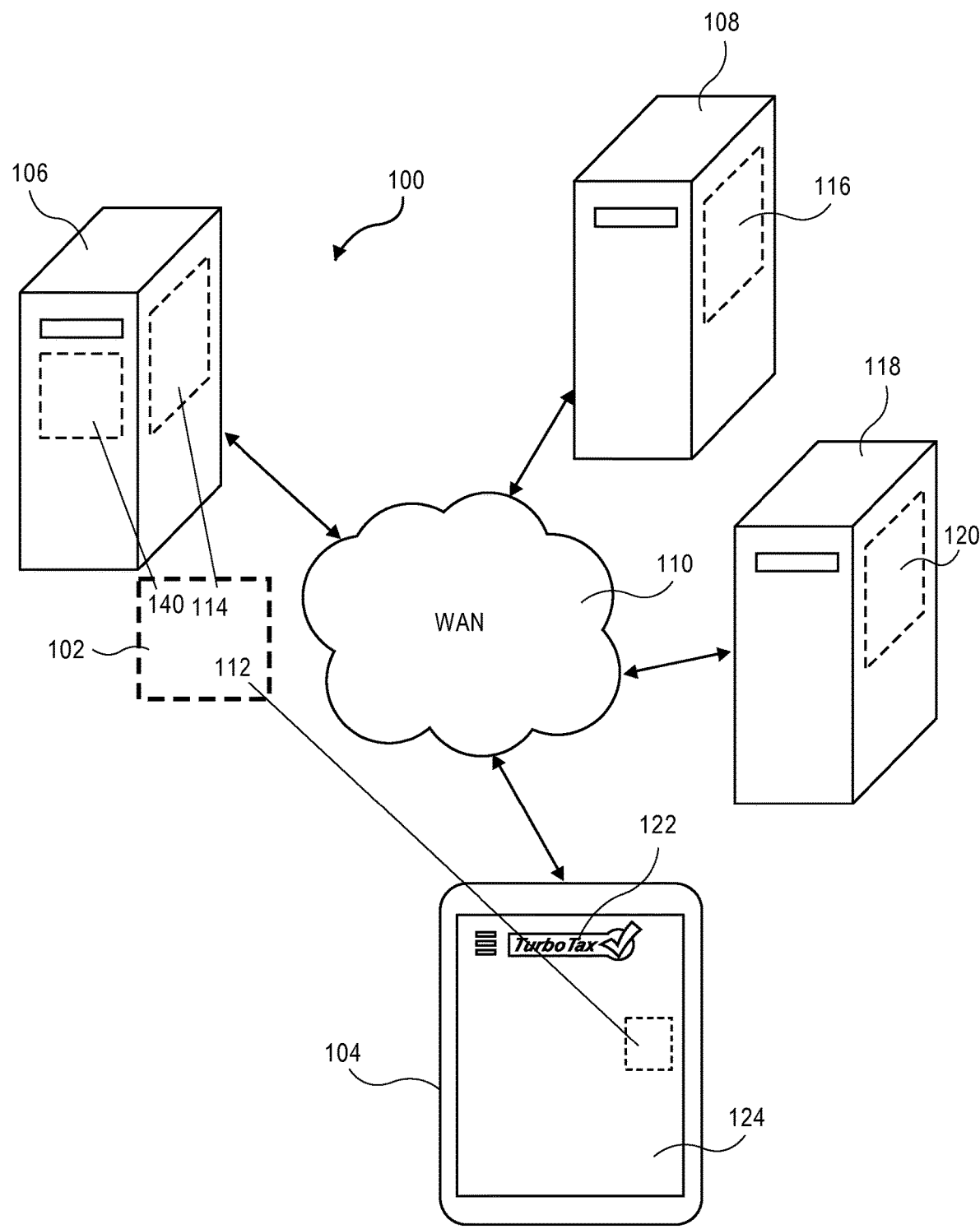

While FIG. 3 depicts the web engine 114 and the machine learning system 140 as running on the same browser rendering computer 106, the web engine 114 and the machine learning system 140 can run on different computers in other embodiments. While FIG. 3 depicts the client computer 104 as a desktop computer, the client computer 104 can be any computing device, including a laptop computer or a computing device of a mobile communication device, smartphone or tablet computing device, as shown in FIG. 4. Embodiments in which the client computer 104 is a mobile communication device, smartphone or tablet computing device, the user interface 112 may be part of an application or a plug-in, such as a JAVA plug-in or a CHROME extension.

Examples of tax return preparation programs 120 that may be programmed to utilize tax data acquired by the tax data acquisition system 102 according to embodiments include, but are not limited to, desktop or online versions of TURBOTAX, PROSERIES and LACERTE tax return preparation applications, available from Intuit Inc.; H&R BLOCK tax return preparation application available from H&R Block, Inc.; and TAXACT tax return preparation application available from TaxAct, Inc. TURBOTAX, PROSERIES AND LACERTE are registered trademarks of Intuit Inc., Mountain View, Calif. H&R BLOCK is a registered trademark of HRB Innovations, Inc., Las Vegas, Nev. TAXACT is a registered trademark of TaxAct, Inc., Cedar Rapids, Iowa. Notwithstanding the listing of these exemplary programs 120, tax data acquisition systems 102 according to the described embodiments are usable with all tax return preparation programs.

The tax return preparation computer 118 is specially or particularly configured or operable to host an on-line version of the tax return preparation program 120 and to store tax data. The tax return preparation computer 118 can also format and electronically file electronic tax returns with a computer of a tax authority. Examples of a tax authority or other tax collecting entity include a federal tax authority, e.g., the Internal Revenue Service (IRS), a state tax authority or other tax collecting entity of the United States, a state thereof, or another country or state thereof (generally, "tax authority"). Examples of hosts that provide the special purpose tax return preparation computer 118 include, for example, Intuit Inc., which provides a tax return preparation computer 118 or server of the Intuit Electronic Filing Center for electronically filing tax returns and other hosts that provide tax return preparation programs 120 and electronic filing servers.

In some embodiments, a plurality of users may each physically interface with respective ones of the tax return preparation computing systems 102 (not shown). In various embodiments, the tax return preparation program 120 may reside on the client computer 104 or, alternatively, the tax return preparation program 120 may reside on a remote tax return preparation computer 118 connected to the client computer 104 via the network 110, as illustrated in FIGS. 3 and 4. The tax return preparation program 120, whether residing on the client computer 104 or the tax return preparation computer 118, may be accessed via a tax return preparation web browser 122 on the client computer 104. While the tax data acquisition systems 102 depicted in FIGS. 1 to 4 run on a client computer 104 and a browser server computer 106, in other embodiments the tax data acquisition systems 102 may also run on one or more other computing devices connected to the hardware system 100. The various client computers 104 may include visual displays or screens 124 operatively coupled thereto.

Each of the networks 110 discussed herein (generally, network 110) may be two or more different but interconnected networks depending on the system configuration and communication protocols employed. The network 110 may include, for example, a wireless or cellular network, a Local Area Network (LAN) and/or a Wide Area Network (WAN). Reference to network 110 generally is not intended to refer to a specific network or communications protocol, and embodiments can be implemented using various networks and combinations thereof.

Figure 5:
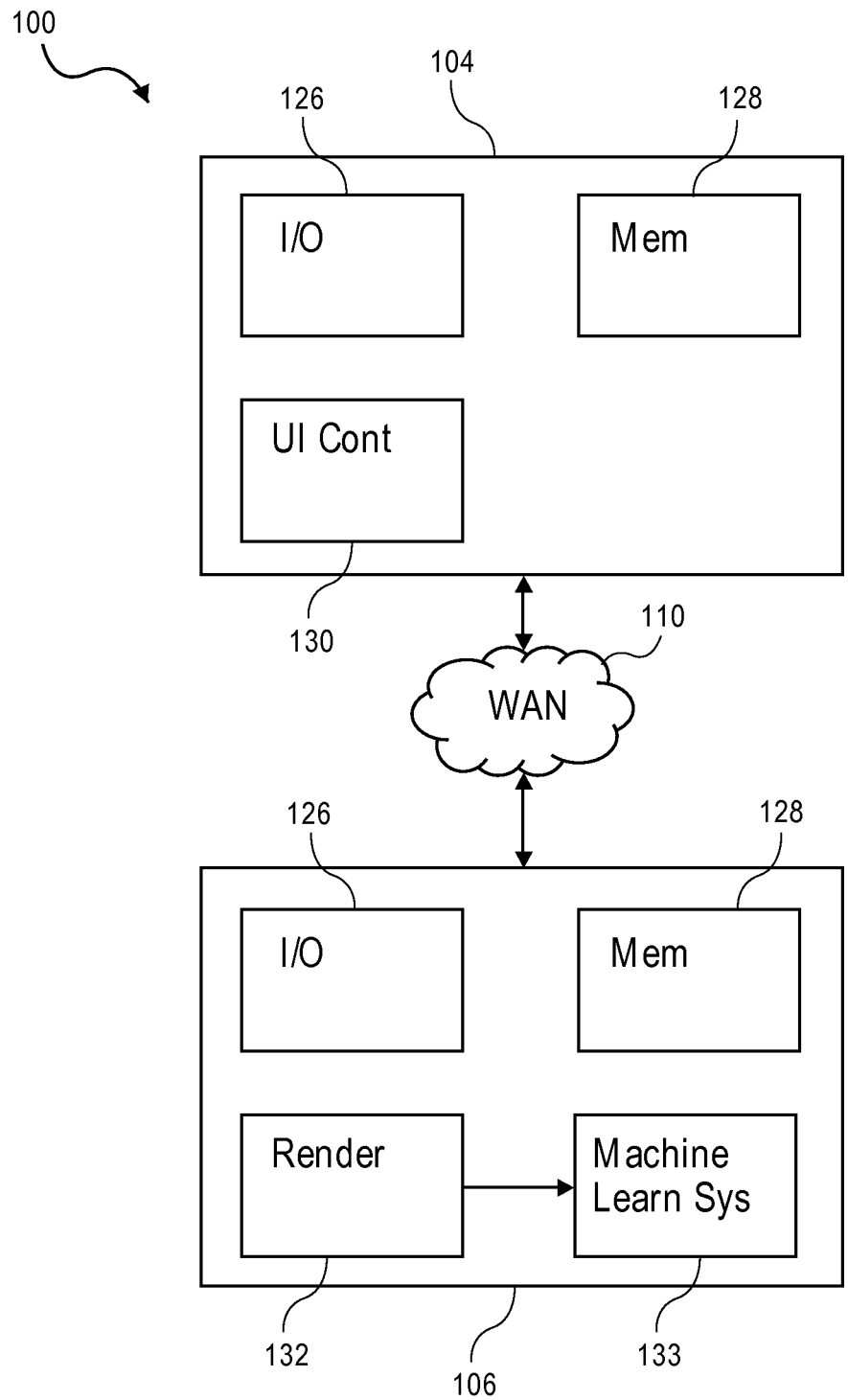
FIGS. 5 to 7 are block diagrams of computer systems according to various embodiment on which a tax data acquisition system may be implemented.

FIG. 5 depicts, in greater detail, another hardware system 100 configured to host a tax data acquisition system 102 according to one embodiment. Like the systems 100 depicted in FIGS. 1-4, the system 100 in FIG. 5 includes a client computer 104 and a browser server computer 106 connected by a network 110. The client computer 104 includes an input/output module 126, a memory module 128, and a user interface controller 130. The browser server computer 106 includes an input/output module 126, a memory module 128, a rendering instruction generator 132, and a machine learning system 140. The input/output modules 126 are configured to communicate with and facilitate the receipt and transfer of information, including interface and tax data, from and to various computers (e.g., client computer 104, server browser 106, third party computer 108, and tax return preparation computer 118) for tax data acquisition. The memory modules 128 are configured to store information, including interface and tax data, in proper formats for tax data acquisition. The user interface controllers 130 are configured to control a user interface for tax data acquisition (e.g., via user input interface elements and displaying rendering). The rendering instruction generator 132 is configured to process interface data to generate rendering instructions (e.g., for a display 124). The machine learning system 140 is configured to (1) derive navigation information for an unknown website and (2) identify a known website and interact with the known website using previously derived navigation information and previously acquired user information.

Figure 6:
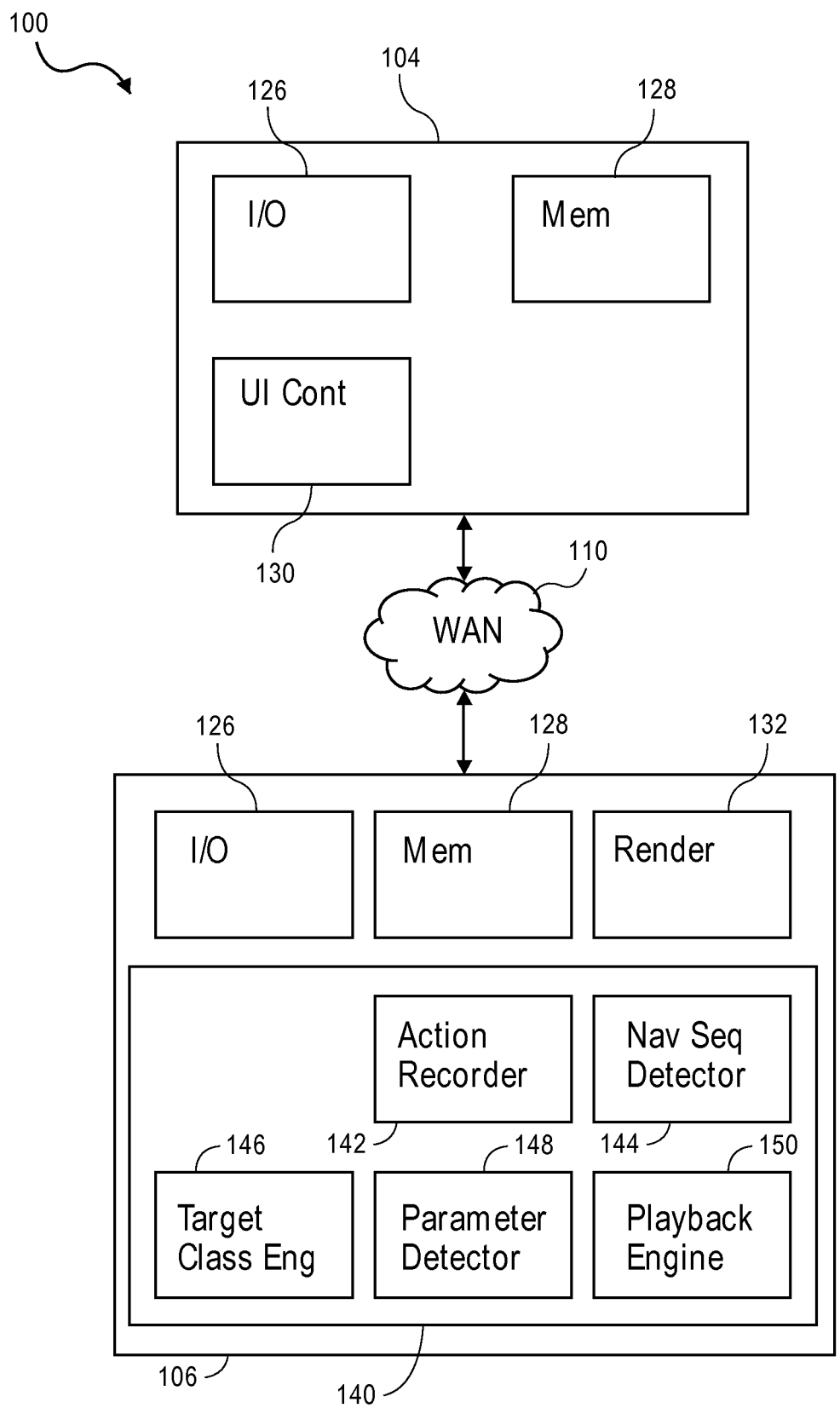

FIG. 6 depicts, in even greater detail, another hardware system 100 configured to host a tax data acquisition system 102 according to one embodiment. Like the systems 100 depicted in FIGS. 1-5, the system 100 in FIG. 6 includes a client computer 104 and a browser server computer 106 connected by a network 110. The client computer 104 includes an input/output module 126, a memory module 128, and a user interface controller 130. The browser server computer 106 includes an input/output module 126, a memory module 128, a rendering instruction generator 132, and a machine learning system 140. The machine learning system 140 includes an action recorder 142, a navigation sequence detector 144, a target classification engine 146, a parameter detector 148, and a playback engine 150.

Figure 7:
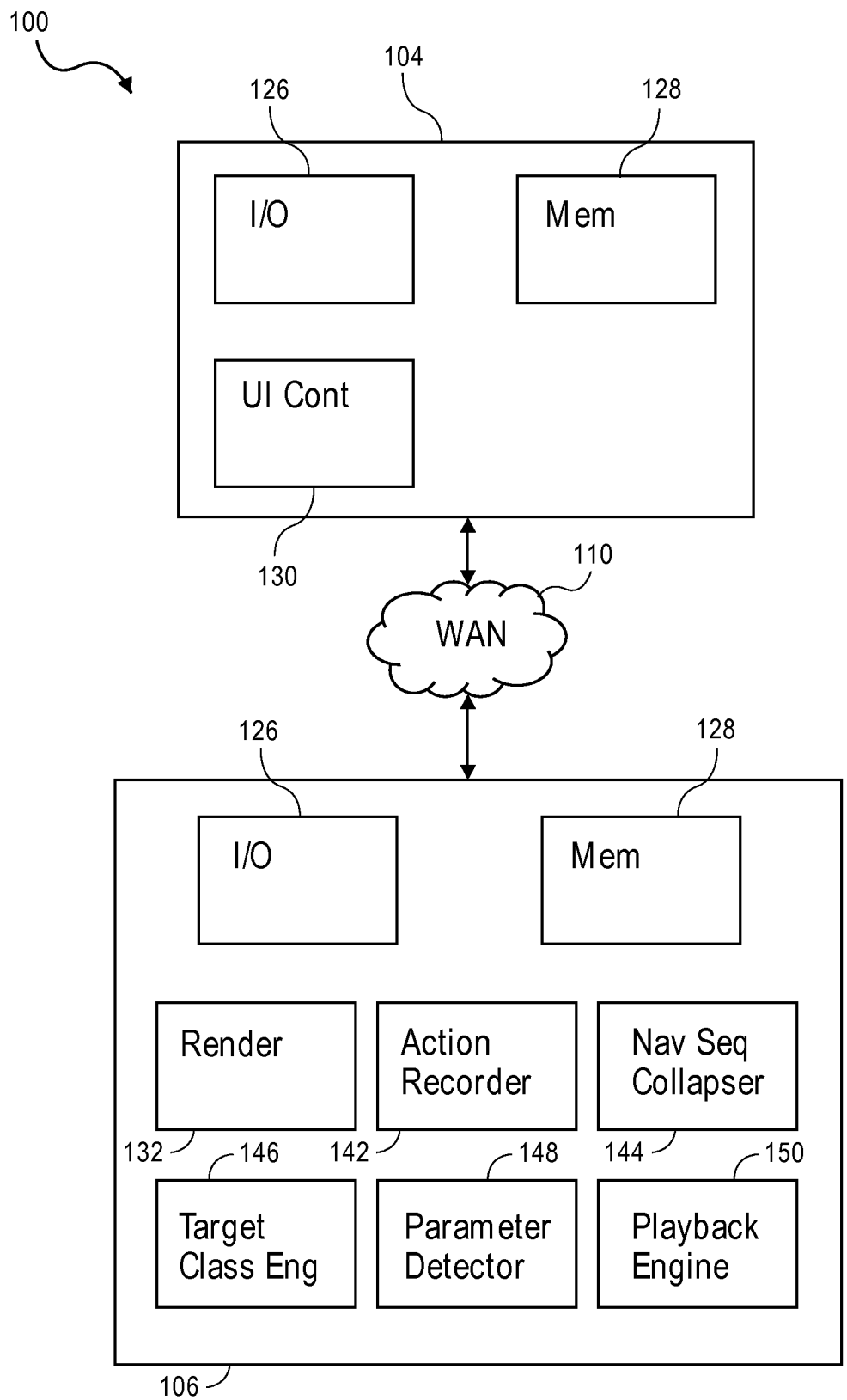

The input/output modules 126 are configured to communicate with and facilitate the receipt and transfer of information, including interface and tax data, from and to various computers (e.g., client computer 104, server browser 106, third party computer 108, and tax return preparation computer 118) for tax data acquisition. The memory modules 128 are configured to store information, including interface and tax data, in proper formats for tax data acquisition. The user interface controllers 130 are configured to control a user interface for tax data acquisition (e.g., via user input interface elements and displaying rendering). The rendering instruction generator 132 is configured to process interface data to generate rendering instructions (e.g., for a display 124). The machine learning system 140 is configured to (1) derive navigation information for an unknown website and (2) identify a known website and interact with the known website using previously derived navigation information and previously acquired user information. The action recorder 142 is configured to read and store user interactions on a website. The navigation sequence detector 144 is configured to analyze user website interactions to derive navigation information the website. The target classification engine 146 is configured to determine whether two websites are substantially similar to each other, as defined above. The parameter detector 148 is configured to parameterize a website field. The playback engine 150 is configured to interact with a website using previously derived navigation information and previously obtained user information. While FIG. 6 depicts the action recorder 142, navigation sequence detector 144, target classification engine 146, parameter detector 148, and playback engine 150 as parts of a machine learning system 140, these components/modules may be separately found in the browser server computer 106, as shown in FIG. 7.

While FIGS. 3 and 4 illustrate user interface 112 of the tax data acquisition system 102 and the tax return web browser 122 as running on the same client computer 104, these programs may run on different computers that are communicatively coupled by a network 110.

In the embodiments depicted in FIGS. 3 and 4, the tax return preparation program 120 is an on-line tax return preparation program hosted by a tax return preparation computer 118 and accessed by a client computer 104 using a tax return preparation web browser 122, but embodiments may also involve a local tax return preparation program that executes on client computer 104, which may also be accessed using a tax return preparation web browser 122. For ease of explanation, reference is made generally to tax return preparation program 120.

Figure 8:
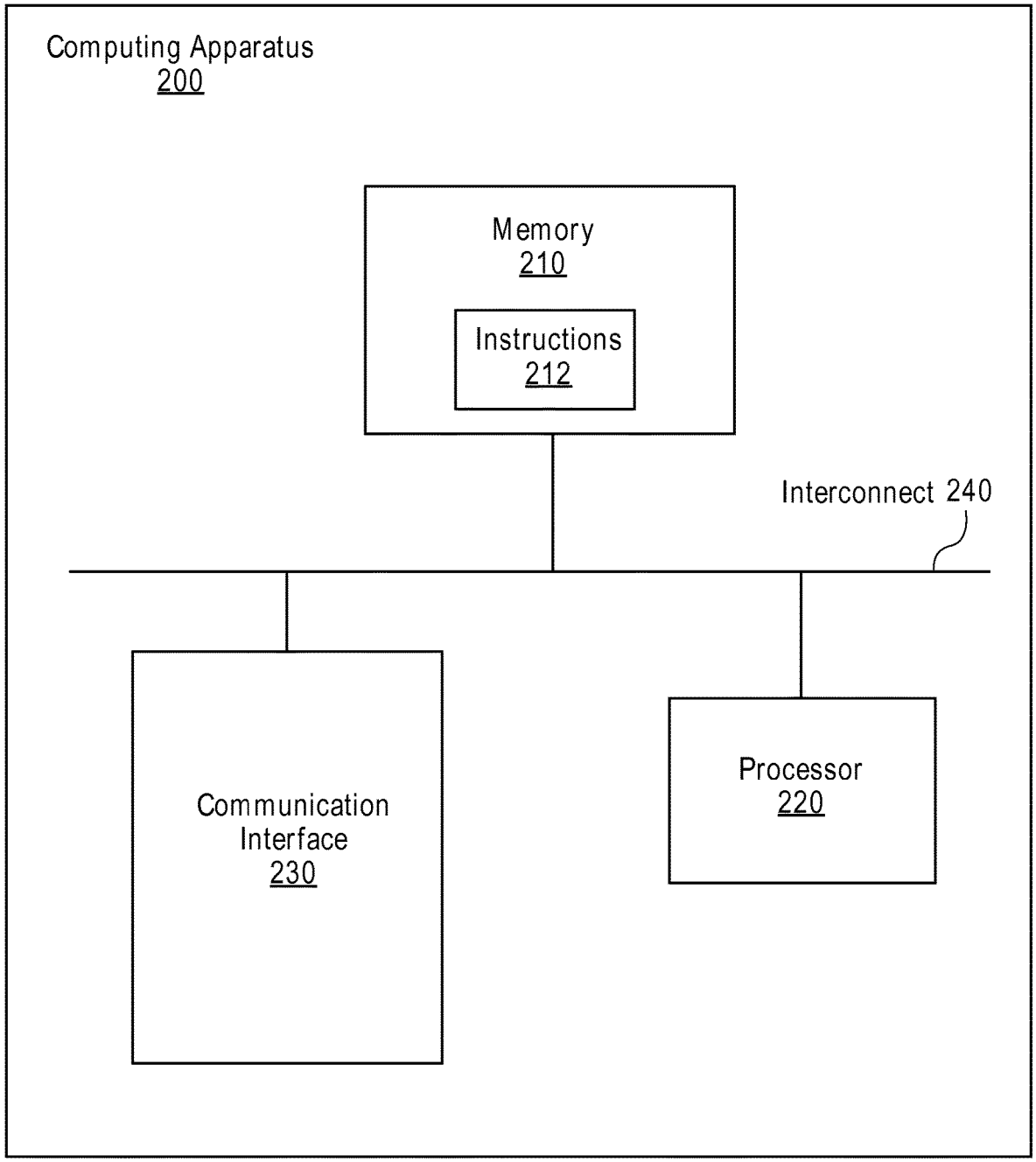
FIG. 8 is a block diagram of a computing apparatus or system in which various embodiments may be implemented or that may be utilized to execute various embodiments.

FIG. 8 generally illustrates certain components of a computing device 200 that may be utilized to execute embodiments and that includes a memory 210, program instructions 212, a processor or controller 220 to execute instructions 212, a network or communications interface 230, e.g., for communications with a network or interconnect 240 between such components. The memory 210 may be or include one or more of cache, RAM, ROM, SRAM, DRAM, RDRAM, EEPROM and other types of volatile or non-volatile memory capable of storing data. The processor unit 220 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network. Accordingly, the system configuration provided in FIG. 8 is provided to generally illustrate how embodiments may be configured and implemented. The processor units 220 in the client computer 104, browser rendering computer 106, third party computer 108, and tax return preparation computer 118 are programmed with respective user interface 112, web engine 114, machine learning system 140, tax data source program 116, and tax return preparation program 120 so that they are no longer generic computers.

Figure 9:
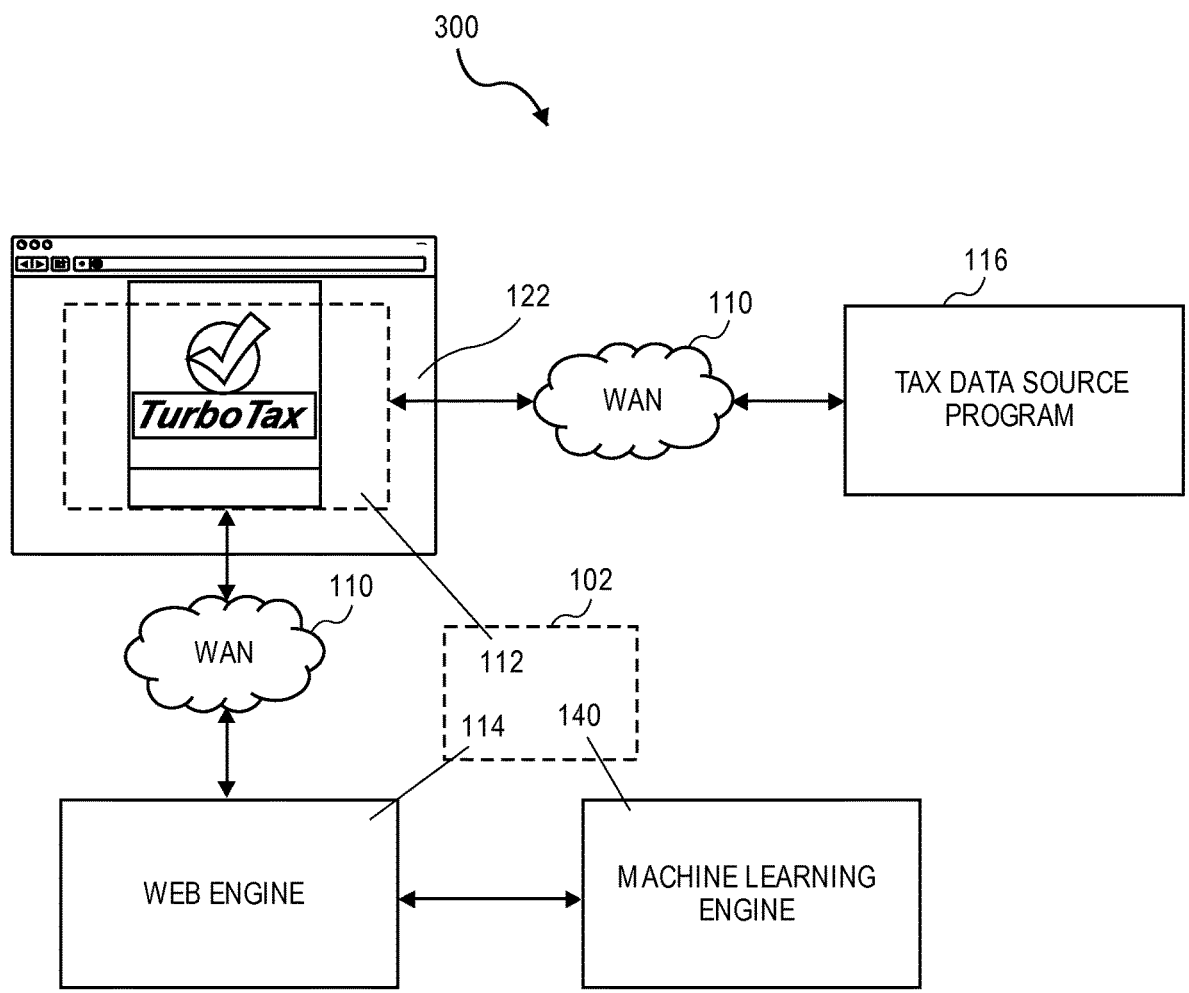
FIGS. 9 and 10 are block diagrams of tax data acquisition systems according to two embodiments.

FIG. 9 depicts a software system 300 including software components of a tax data acquisition system 102 according to one embodiment. The tax data acquisition system 102 includes a user interface 112, a web engine 114, and a machine learning system 140. The user interface 112 may be hosted on a client computer 104 (see FIGS. 1-4). The web engine 114 and the machine learning system 140 may be hosted on a browser server computer 106 (see FIGS. 1-4). The system 300 also includes a tax return preparation web browser 122, which may also be hosted on the client computer 104 (see FIGS. 3 and 4). The tax return preparation web browser 122 may be communicatively coupled to a tax return preparation program 120 hosted on a tax return preparation computer 118 (not shown in FIG. 9, but see FIGS. 3 and 4). The user interface 112 of the tax data acquisition system 102 is overlaid on top of the tax return preparation web browser 122. In some embodiments, the user interface 112 is rendered in a modal window such that the tax return preparation web browser 122 remains open, but is inaccessible, until the modal window is closed.

The user interface 112 and the web engine 114 are communicatively coupled by a network 110 (e.g., a WAN network). The tax data acquisition system 102 is also communicatively coupled to a tax data source program 116. In the embodiment depicted in FIG. 9, the user interface 112, but not the web engine 114, is directly communicatively coupled to the tax data source program 116. In such an embodiment, the coupling of the user interface 112 and the web engine 114 may not be detectable by the tax data source program 116. In other words, interactions between the user interface 112 and the web engine 114, including transmission of tax data received from the tax data source program 116 may be invisible to the tax data source program 116. Such a system and the benefits thereof are described in further detail in U.S. patent application Ser. No. 14/871,366, filed Sep. 30, 2015, entitled "SYSTEMS FOR ACQUIRING TAX DATA," the contents of which are fully incorporated herein by reference as though set forth in full.

While the web engine 114 and the tax data source program 116 are communicatively coupled to the user interface 112 by the two networks 110, these components of the software system 300 may be communicatively coupled to each other by the same network 110 (as shown in FIGS. 1-5). In such embodiments, the user interface 112 and the web engine 114 may be programmed such that one or both of these components communicate with the tax data source program 116.

Figure 10:
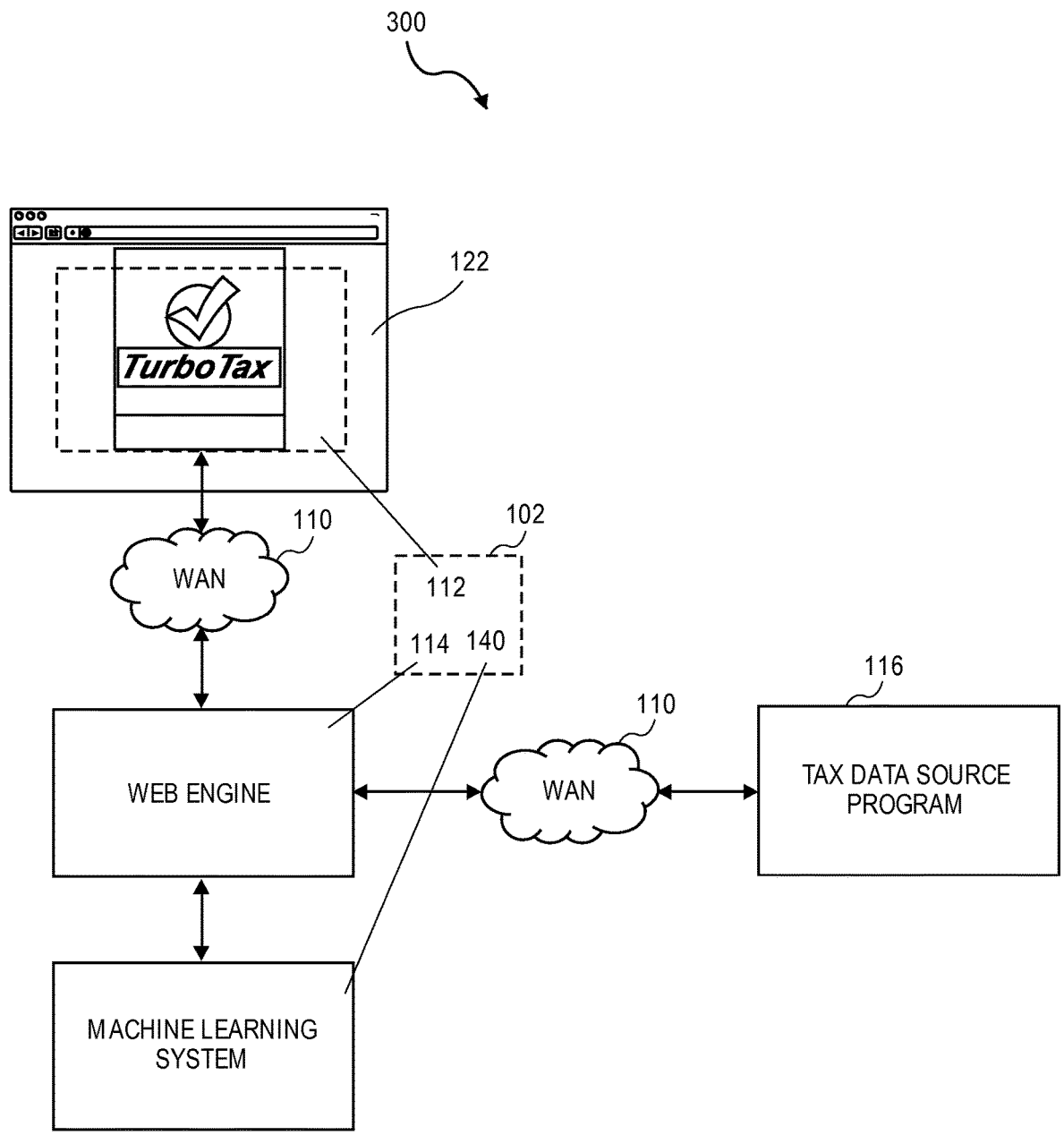

FIG. 10 depicts a software system 300 including software components of the tax data acquisition system 102 according to one embodiment. The tax data acquisition system 102 includes a user interface 112, a web engine 114, and a machine learning system 140. The user interface 112 may be hosted on a client computer 104 (see FIGS. 1-4). The web engine 114 and the machine learning system 140 may be hosted on a browser server computer 106 (see FIGS. 1-4). The system 300 also includes a tax return preparation web browser 122, which may also be hosted on the client computer 104 (see FIGS. 3 and 4). The tax return preparation web browser 122 may be communicatively coupled to a tax return preparation program 120 hosted on a tax return preparation computer 118 (not shown in FIG. 10, but see FIGS. 3 and 4). The user interface 112 of the tax data acquisition system 102 is overlaid on top of the tax return preparation web browser 122. In some embodiments, the user interface 112 is rendered in a modal window such that the tax return preparation web browser 122 remains open, but is inaccessible, until the modal window is closed.

The user interface 112 and the web engine 114 are communicatively coupled by a network 110 (e.g., a WAN network). The tax data acquisition system 102 is also communicatively coupled to a tax data source program 116. In the embodiment depicted in FIG. 10, the web engine 114, but not the user interface 112, is directly communicatively coupled to the tax data source program 116. In such an embodiment, the coupling of the user interface 112 and the web engine 114 may not be detectable by the tax data source program 116. In other words, interactions between the user interface 112 and the web engine 114, including transmission of tax data received from the tax data source program 116 may be invisible to the tax data source program 116. While the user interface 112 and the tax data source program 116 are communicatively coupled to the web engine 114 by the two networks 110, these components of the software system 300 may be communicatively coupled to each other by the same network 110 (as shown in FIGS. 1-5). In such embodiments, the user interface 112 and the web engine 114 may be programmed such that one or both of these components communicate with the tax data source program 116.

Figure 11:
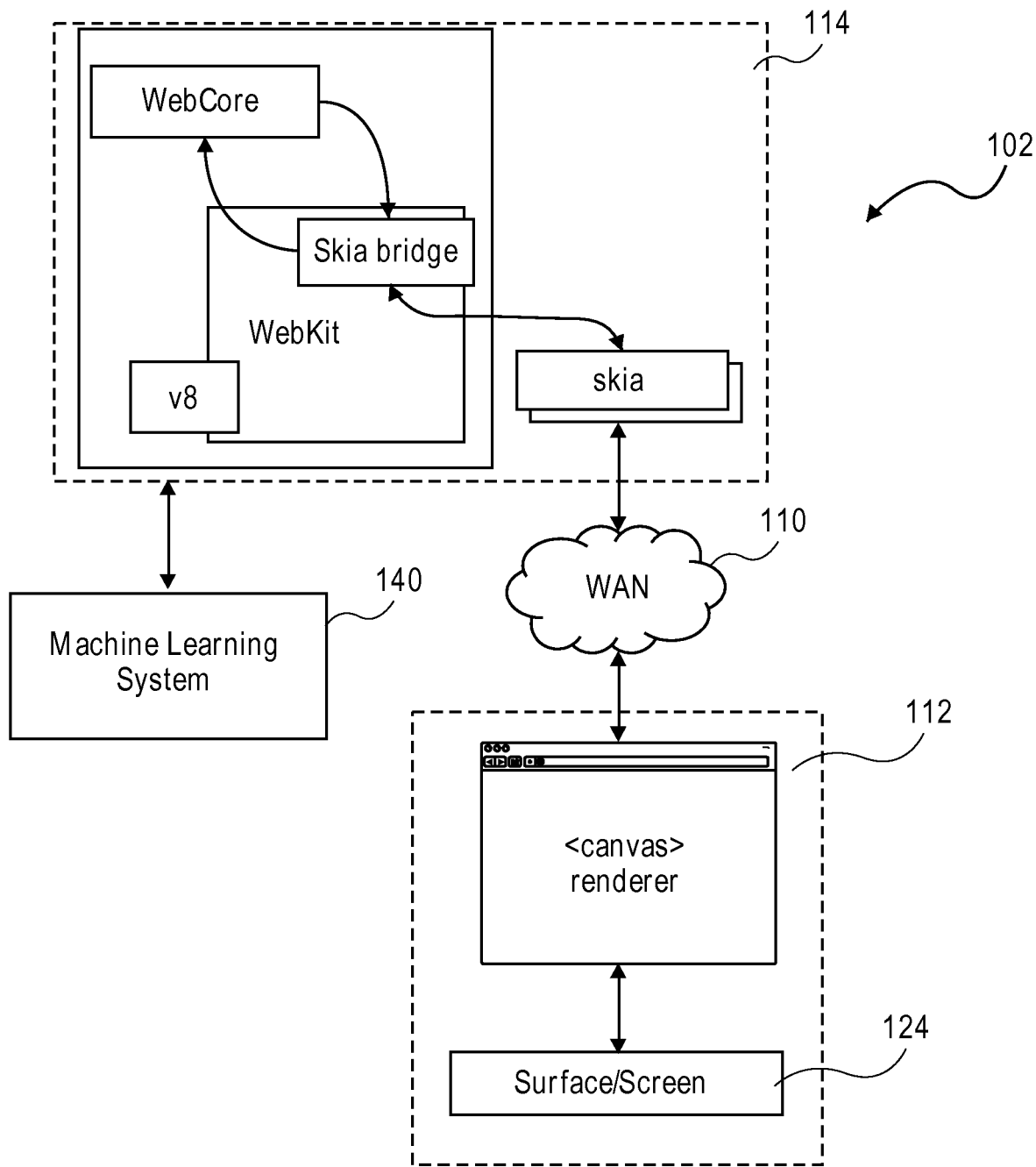
FIG. 11 is a block diagram of a software system for implementation of a tax data acquisition system according to one embodiment.

FIG. 11 depicts an embodiment of a tax data acquisition system 102, including several open source components or modules that may be included in the tax data acquisition system 102 that illustrates the rendering pipeline. The identification of these exemplary system components is illustrative and not intended to be limiting. The tax data acquisition system 102 includes a user interface 112 and a web engine 114. A version of WebKit that may be used to execute the web engine 114 includes the following components or modules. WebCore, is a part of a client side API for WebKit. V8 is the JavaScript engine. The web engine 114 also includes Skia, which is a vector graphics library. Skia Bridge facilitates communication between Skia and the other components of the web engine 114. A machine learning system 140 is also communicatively coupled (e.g., via a bus—not shown) to the web engine 114.

The user interface 112 includes Canvas Renderer, which takes rendering instructions and draws images on a screen 124 according to those instructions. The web engine 114 and the user interface 112 are communicatively coupled by a network 110, which is configured to transmit rendering instructions.

In operation, WebKit processes/transforms webpage computations, including those needed for JavaScript, Cascading Style Sheets ("CSS") and HTML, into vector graphics instructions, which are sent to the Skia library. In turn, Skia processes/transforms the vector graphic instructions into rendering instructions for drawing a webpage onto a display surface. The display surface can be any real or virtual surface upon which a webpage can be rendered, including, but not limited to, a computer screen 124, a mobile device screen 124, or a PDF file. The rendering instructions are transmitted serially to the Canvas Renderer in the user interface 112 over the network 110. Finally, the Canvas Renderer draws an image (e.g., in a browser) on the screen 124.

Figure 12:
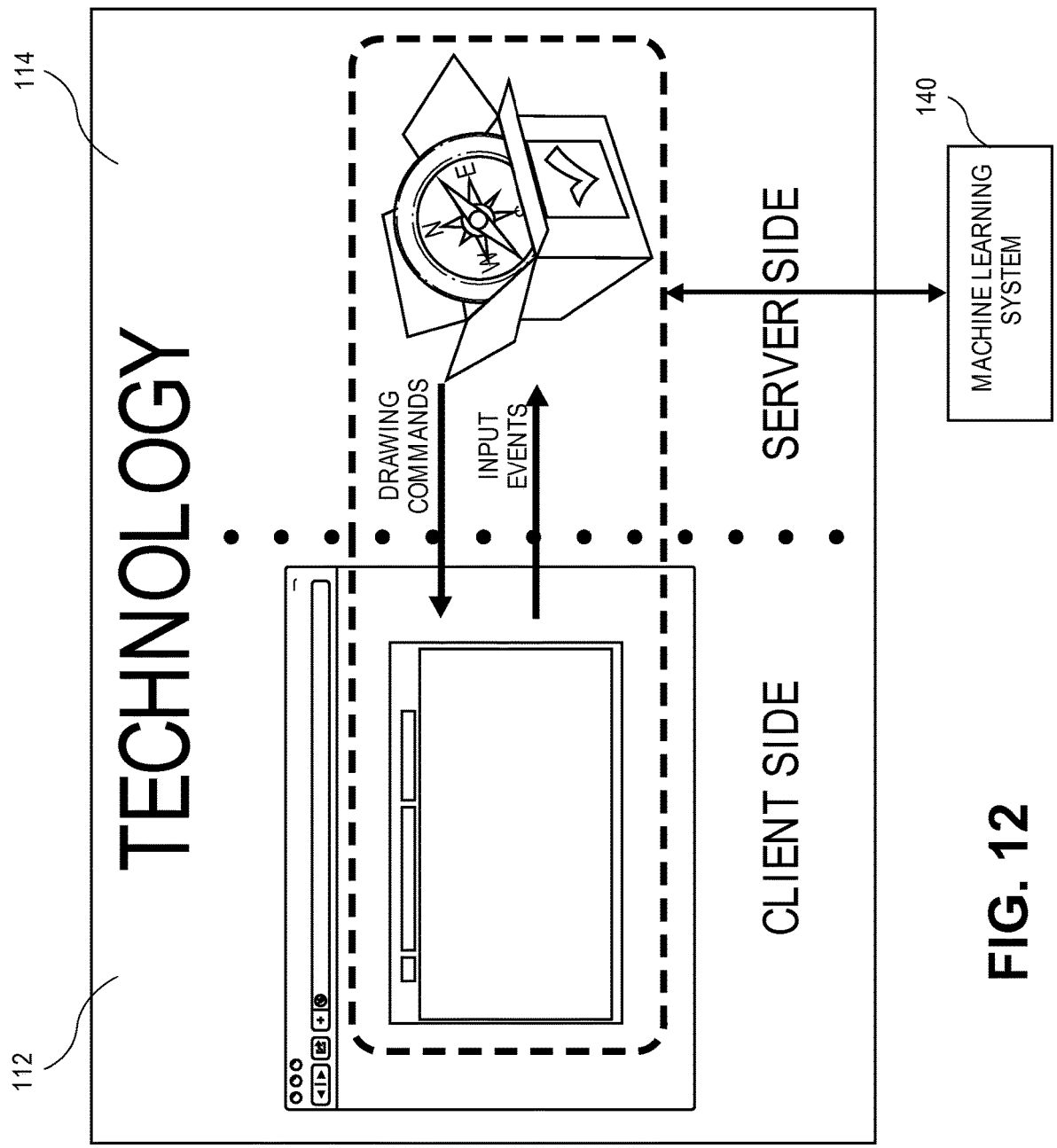
FIG. 12 is a block diagram illustrating the flow of data in a tax data acquisition system according to one embodiment.

FIG. 12 illustrates one embodiment of the data flow between the user interface 112 running on the client computer 104 and the web engine 114 running on the browser server computer 106. Data from input events (from a user input and/or a tax data source program 116) are transmitted from the user interface 112 to the web engine 114. Data in the form of rendering instructions (i.e., drawing commands) are transmitted from the web engine 114 to the user interface 112. The machine learning system 140 operates in the background (i.e., invisible to the user) to read and store the input event data from the user (e.g., interface data) and, in some cases, rendering instructions from the web engine 114 for analysis.

Figure 13:
FIGS. 13 to 16 are exemplary screen shots of a tax data acquisition system according to one embodiment.

FIG. 13 depicts a screen 124 (e.g., of a client computer 104) displaying a tax return preparation web browser 122 of a tax return preparation program 120. The tax return preparation web browser 122 is displayed in a primary (i.e., tax preparation) webpage 134. The tax return preparation web browser 122 includes a user interface object 136 configured to open a secondary (i.e., tax data source) webpage 138 displaying a tax data source program 116. In this embodiment, the tax data source program 116 is a payroll processor (e.g., PAYCHEX). The user interface object 136 includes indicia of the tax data source program 116, for which it is configured to facilitate access.

Figure 14:
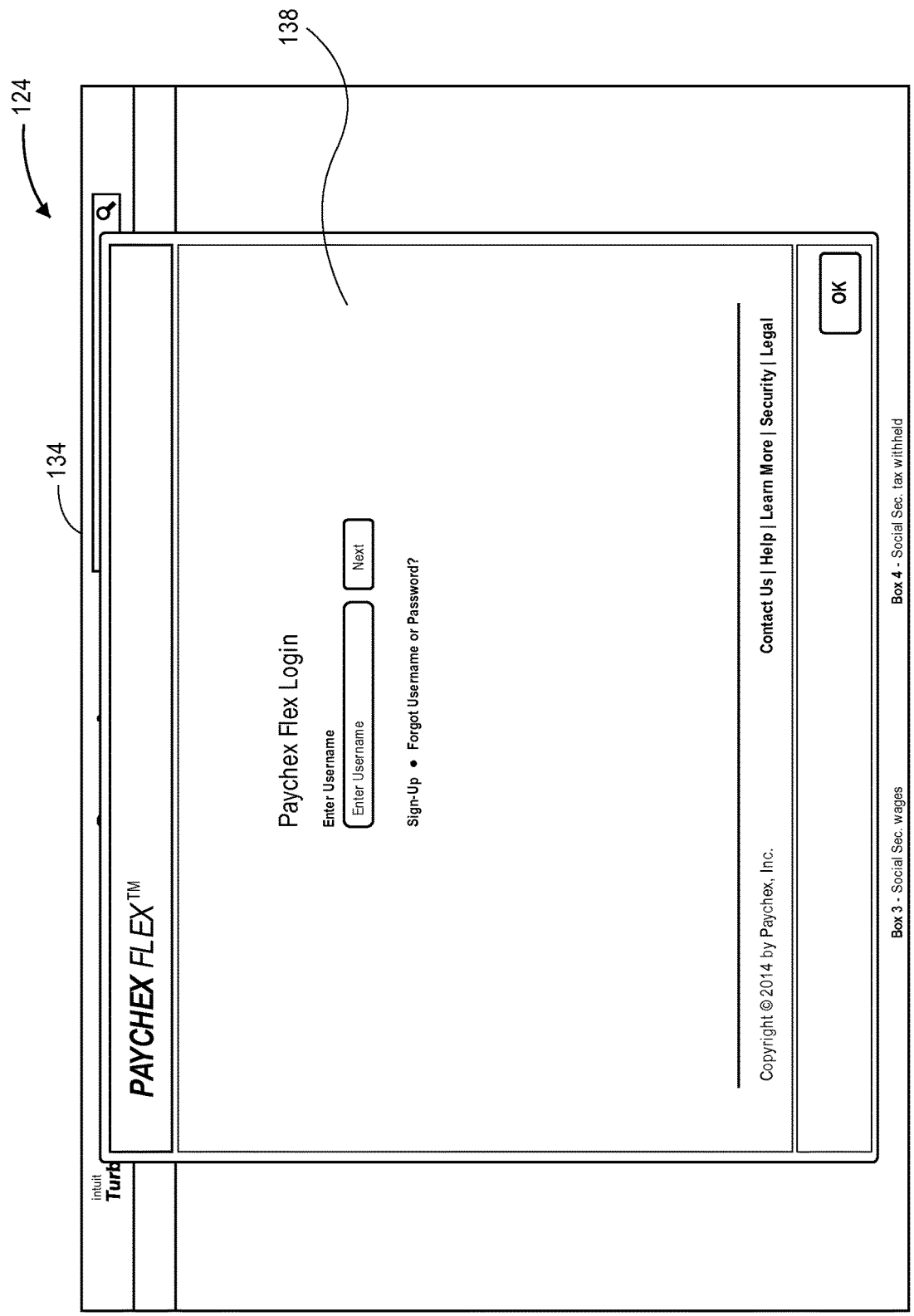

FIG. 14 depicts the screen 124 after a user selects the user interface object 136. The screen 124 displays the secondary webpage 138 (showing the tax data source program 116) overlaying the primary webpage 134 (showing the tax return preparation web browser 122). In this embodiment, the secondary webpage 138 is rendered in a modal window overlaying the primary webpage 134. Therefore, the primary webpage 134 remains open, but is shaded and inaccessible, until the modal secondary webpage 138 is closed. The secondary webpage 138 in FIG. 14 displays a first login screen for the tax data source program 116 configured for entry of a Username.

Figure 15:
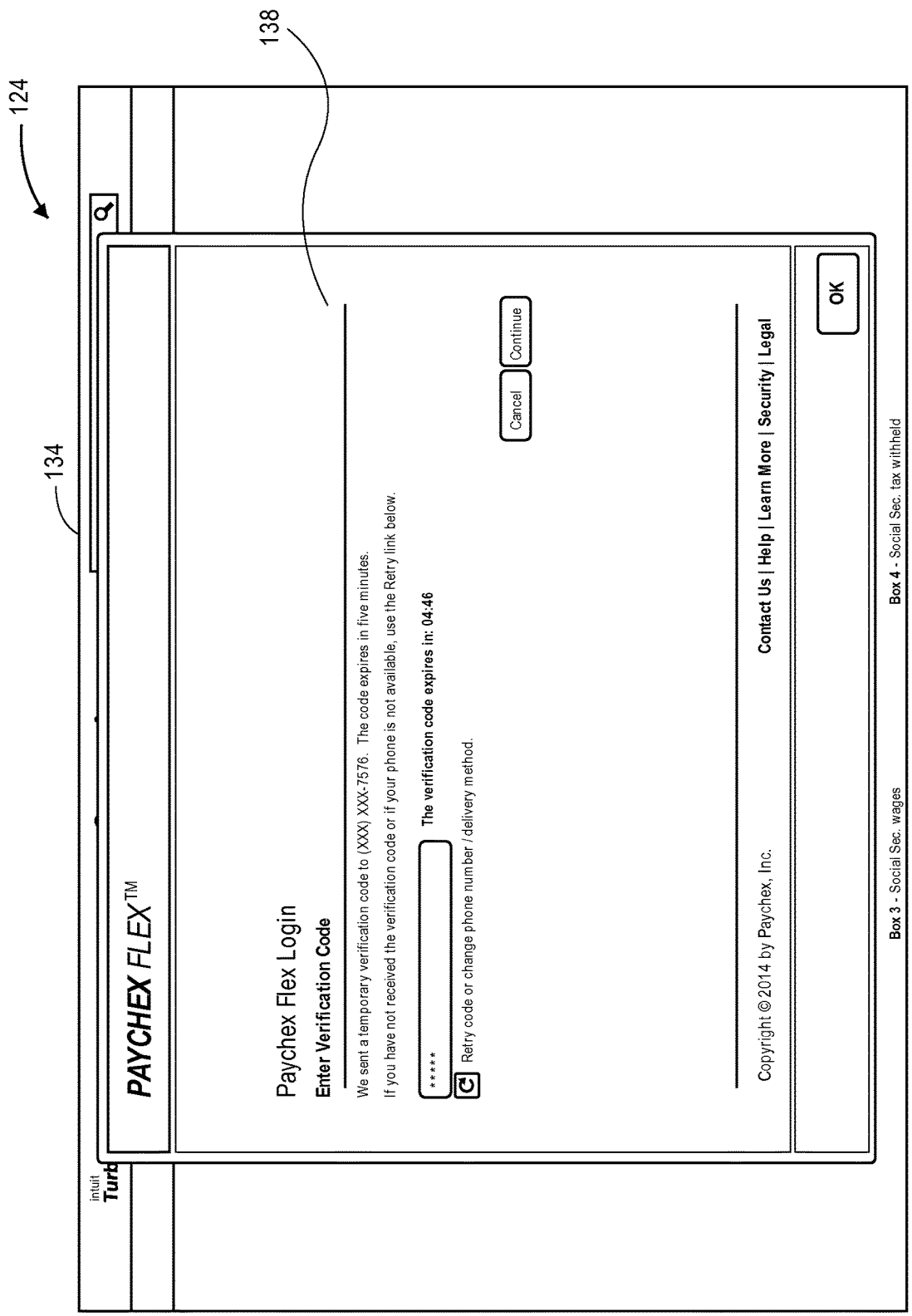

FIG. 15 depicts the screen 124 after the user enters the Username. The secondary webpage 138 in FIG. 13 displays a second login screen for the tax data source program 116 configured for entry of a Verification Code. The primary webpage 134 remains open, but shaded and inaccessible.

Figure 16:
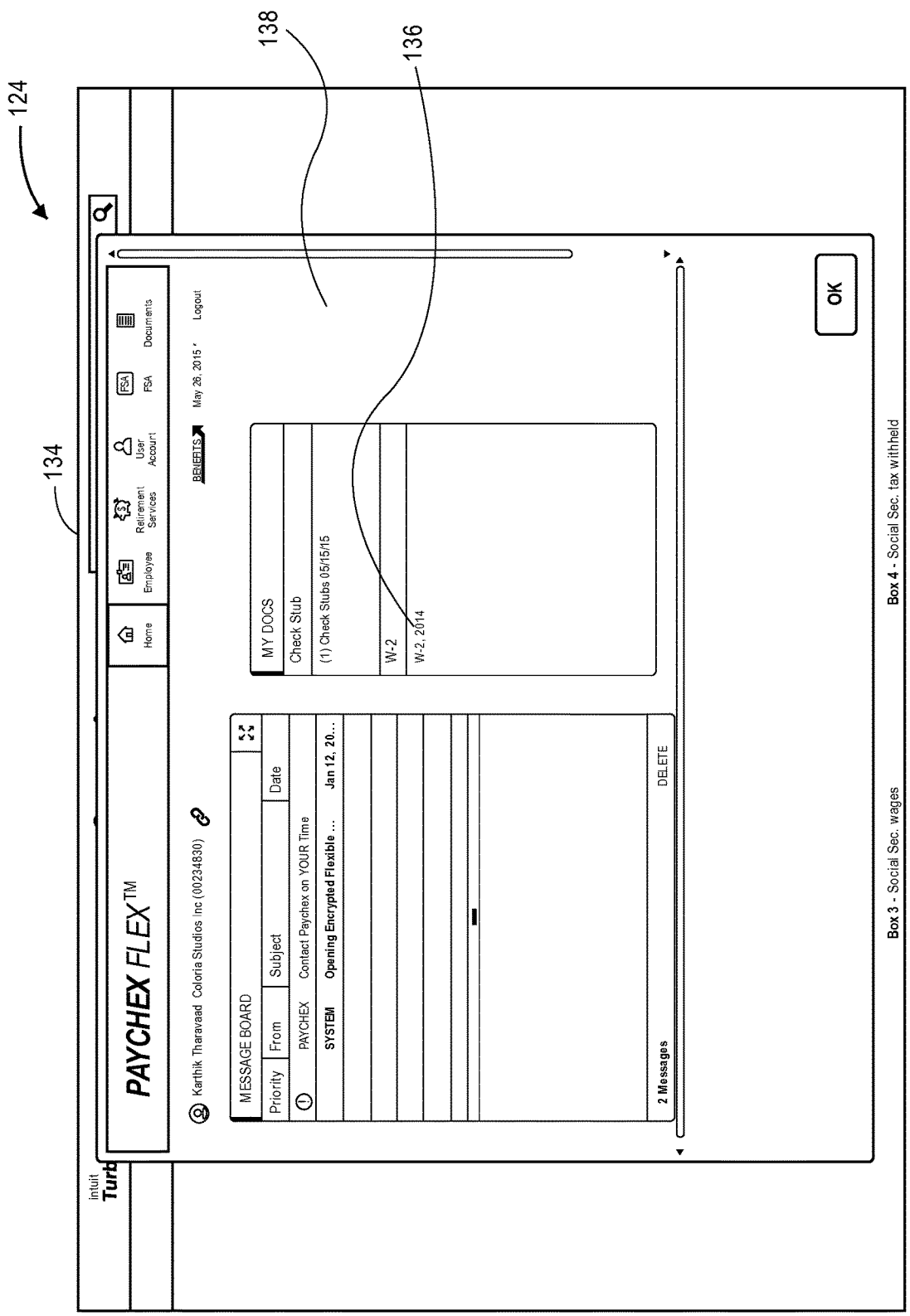

FIG. 16 depicts the screen 124 after the user enters the Verification Code and logs into the tax data source program 116. The secondary webpage 138 in FIG. 16 emulates a home screen for the tax data source program 116. The secondary webpage 138 includes a user interface object 136 configured to download tax data in for form of a W-2 form (in PDF format). The primary webpage 134 remains open, but shaded and inaccessible.

During the process depicted in FIGS. 14-16, the machine learning system 140 operates in the background (i.e., invisible to the user) to read and store the input event data from the user (e.g., interface data) and, in some cases, rendering instructions from the web engine 114 for analysis as described below. While the secondary webpages 138 in FIGS. 14-16 display only webpages rendered according to instructions from the tax data source program 116, the tax data acquisition system 102 may also display annotation user interface objects overlaid on top of the tax data source program webpages. For instance, an annotation user interface object may be an arrow and/or text directing a user to select a user interface object from a tax data source program webpage to acquire tax data. The tax data acquisition system 102 may also display download authorization user interface objects configured to allow a user to authorize download of tax data from the user interface 112 (e.g., to the web engine 114). While the secondary webpages 138 are displayed in modal windows in FIGS. 14-16, the secondary webpages 138 may be side-by-side windows, such that a user can manually switch between active windows.

Figure 17:
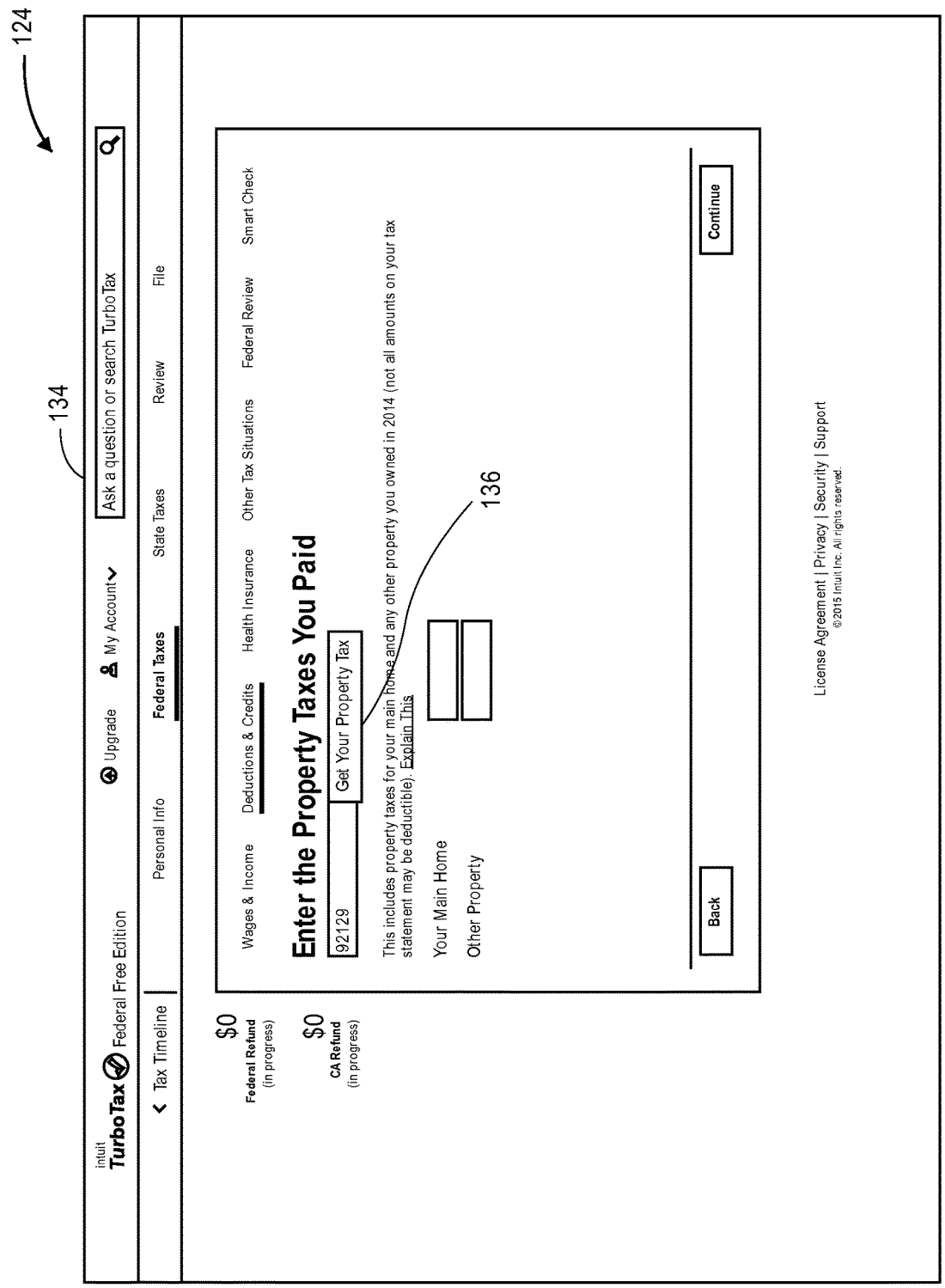

FIG. 17 depicts a screen 124 (e.g., of a client computer 104) displaying a tax return preparation web browser 122 of a tax return preparation program 120. The tax return preparation web browser 122 is displayed in a primary (i.e., tax preparation) webpage 134. The tax return preparation web browser 122 includes a user interface object 136 configured to open a secondary (i.e., tax data source) webpage 138 for a tax data source program 116. In this embodiment, the tax data source program 116 is a property tax data source (e.g., county accessor's office). The user interface object 136 includes a fillable field configured to receive a zip code of a property for which property tax was paid. As shown in FIG. 17, the zip code has already been filled into the user interface object 136, either manually by the user or automatically by the tax return preparation program 120.

Figure 18:

FIG. 18 depicts the screen 124 after a user selects the user interface object 136 depicted in FIG. 17. Because the system 102 does not have information regarding the source of the property tax information for the zip code entered in FIG. 17, the tax return preparation web browser 122 displays another user interface object 136 configured to initiate a process through which the user will navigate (e.g., using a search engine) to the source of the property tax information. The user interface object 136 depicted in FIG. 18 also initiates a machine learning process based on the user navigation.

Figure 19:
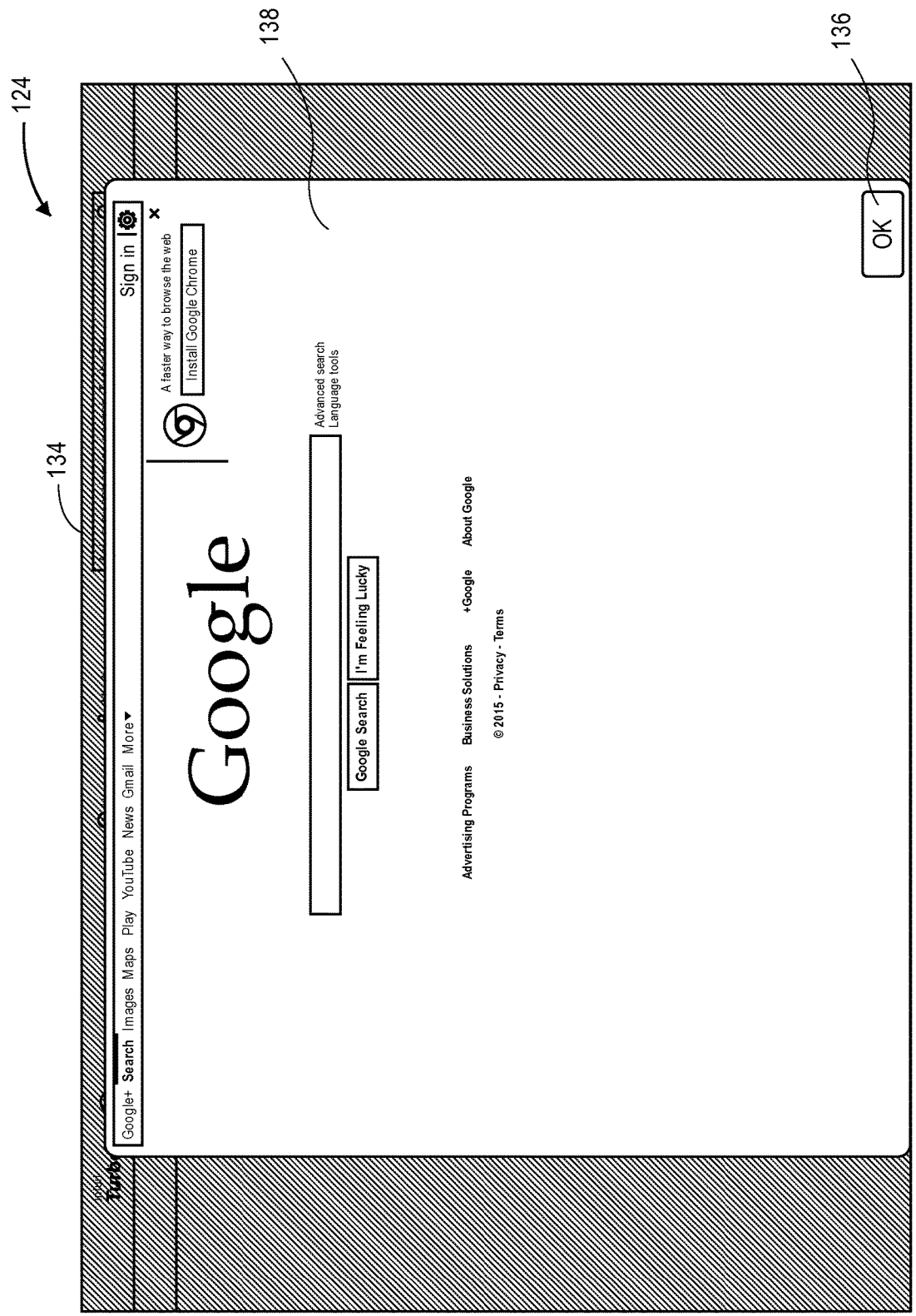

FIG. 19 depicts the screen 124 after a user selects the user interface object 136 depicted in FIG. 18. The screen 124 displays the secondary webpage 138 (showing a search engine landing page) overlaying the primary webpage 134 (showing the tax return preparation web browser 122). In this embodiment, the secondary webpage 138 is rendered in a modal window overlaying the primary webpage 134. Therefore, the primary webpage 134 remains open, but is shaded and inaccessible, until the modal secondary webpage 138 is closed. The secondary webpage 138 in FIG. 19 displays a landing page for a search engine configured to facilitate a user's navigation to the source of the property tax information. The secondary webpage 138 in FIG. 19 displays two user interface objects 136 configured to enter web search data and to initiate a web search. While the interface object 136 for web search data in the landing page is blank in FIG. 19, the landing page may be pre-filled with some user provided information in other embodiments.

Figure 20:
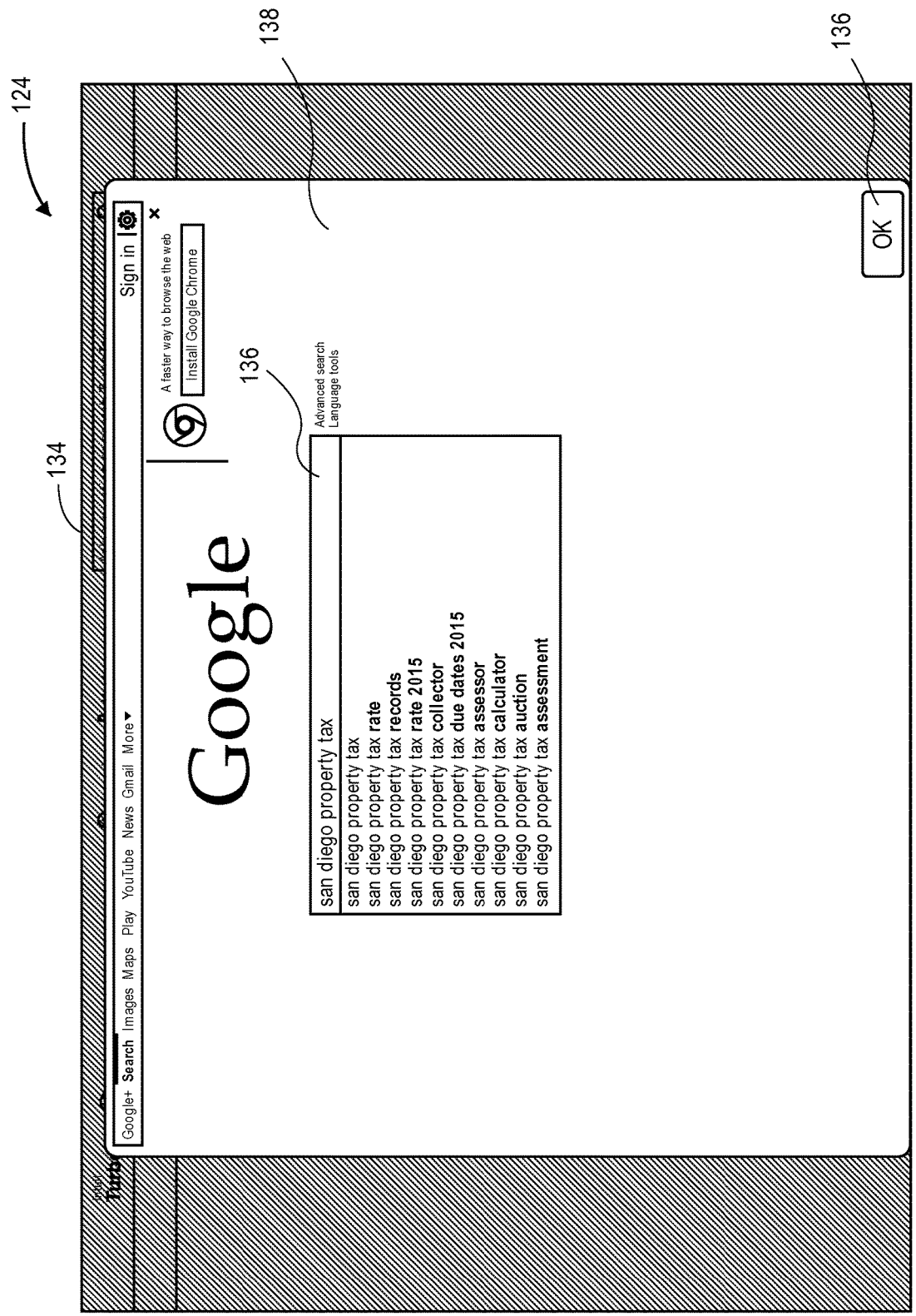

FIG. 20 depicts the screen 124 after information relating to property tax (e.g., name of city) has been entered into the user interface object 136 depicted in FIG. 19 (either manually by a user or automatically). The screen 124 displays the secondary webpage 138 (showing a search engine landing page) overlaying the primary webpage 134 (showing the tax return preparation web browser 122). In this embodiment, the secondary webpage 138 is rendered in a modal window overlaying the primary webpage 134. Therefore, the primary webpage 134 remains open, but is shaded and inaccessible, until the modal secondary webpage 138 is closed. The secondary webpage 138 in FIG. 20 also displays the user interface object 136 configured to initiate a search.

Figure 21:

FIG. 21 depicts the screen 124 after a user selects the user interface object 136 depicted in FIG. 20 to initiate a web search for a source of the property tax information. The screen 124 displays the secondary webpage 138 (showing a property tax search webpage of a particular county tax collector website) overlaying the primary webpage 134 (showing the tax return preparation web browser 122). In this embodiment, the secondary webpage 138 is rendered in a modal window overlaying the primary webpage 134. Therefore, the primary webpage 134 remains open, but is shaded and inaccessible, until the modal secondary webpage 138 is closed. The secondary webpage 138 in FIG. 21 displays four user interface objects 136 configured to enter property tax search data (e.g., address) and to initiate a property tax search.

Figure 22:

FIG. 22 depicts the screen 124 after a user enters property tax search data and initiates a property tax search using the user interface objects 136 depicted in FIG. 21. The screen 124 displays the secondary webpage 138 (showing a property tax record for a particular property corresponding to the property tax search data (i.e., address)) entered in the user interface objects 136 depicted in FIG. 21) overlaying the primary webpage 134 (showing the tax return preparation web browser 122). In this embodiment, the secondary webpage 138 is rendered in a modal window overlaying the primary webpage 134. Therefore, the primary webpage 134 remains open, but is shaded and inaccessible, until the modal secondary webpage 138 is closed. The secondary webpage 138 in FIG. 22 displays the property tax record. The secondary webpage 138 also includes a user interface object (not shown) prompting the user to select the total property tax paid (e.g., by clicking on or drawing a box around the value). The system 102 can also identify the total property tax using content classification and prompt the user to confirm the identification (e.g., by selection). Data acquisition systems incorporating content classification are described in detail in U.S. patent application Ser. No. 14/871,802, filed Sep. 30, 2015, entitled "WEB BROWSING AND MACHINE LEARNING SYSTEMS FOR ACQUISITION OF TAX DATA DURING PREPARATION OF ELECTRONIC TAX RETURN," the contents of which are fully incorporated herein by reference as though set forth in full.

Figure 23:
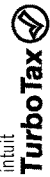

FIG. 23 depicts the screen 124 after a user identifies the total property tax paid on the property tax record depicted in FIG. 22. The screen 124 displays the secondary webpage 138 (showing the property tax record depicted in FIG. 22 with a user interface object 136 displaying the identified total property tax) overlaying the primary webpage 134 (showing the tax return preparation web browser 122). In this embodiment, the secondary webpage 138 is rendered in a modal window overlaying the primary webpage 134. Therefore, the primary webpage 134 remains open, but is shaded and inaccessible, until the modal secondary webpage 138 is closed. The secondary webpage 138 in FIG. 22 displays the property tax record and a user interface object 136 prompting the user to confirm importation of the identified total property tax paid into the tax return preparation program 120 (e.g., by clicking on the user interface object 136). At the same time, the machine learning system 140 running in the background (i.e., invisible to the user) learns the navigation information for the property tax source website.

Figure 24:
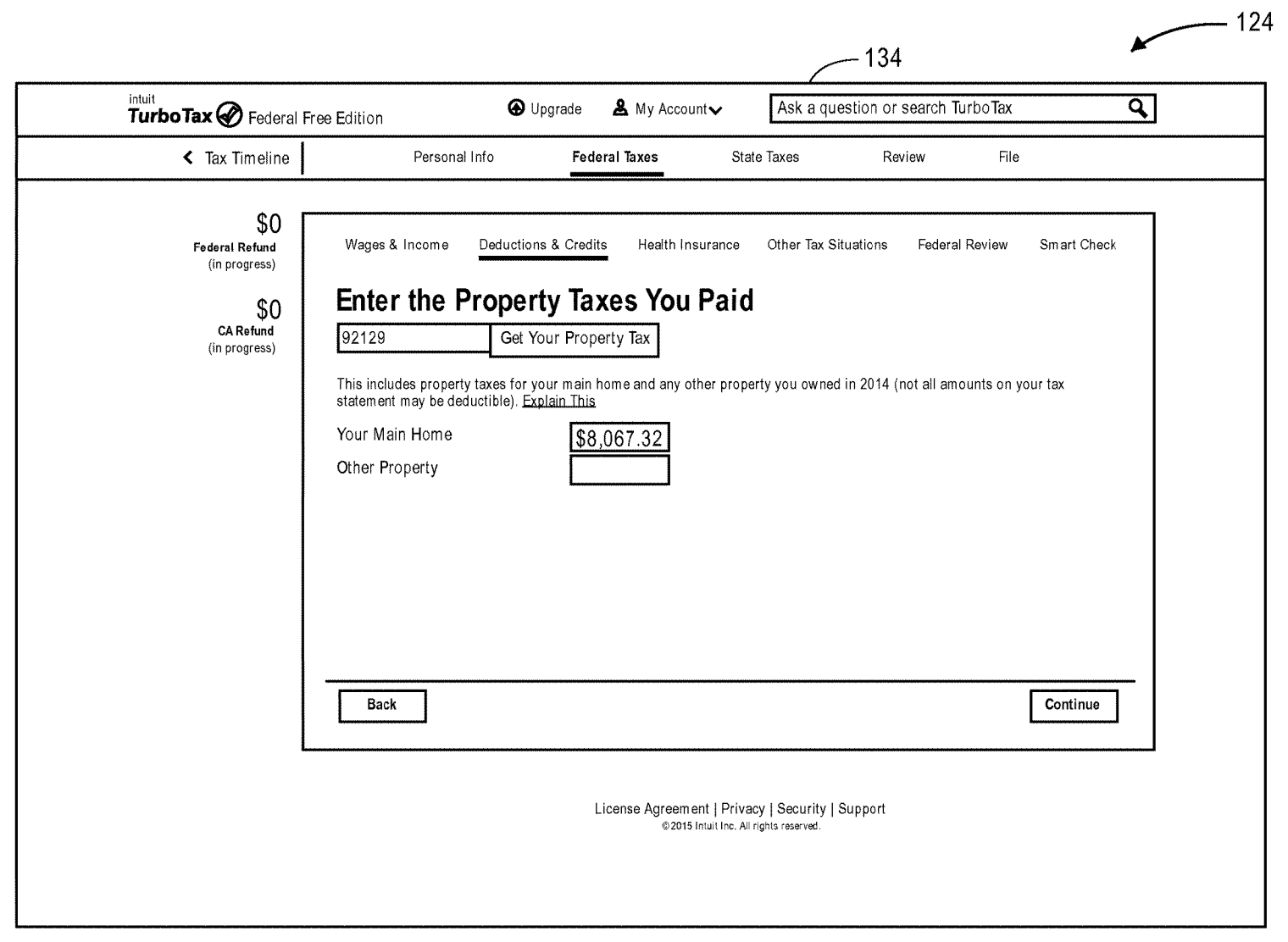

FIG. 24 depicts the screen 124 after a user confirms importation of the identified total property tax paid on the property tax record depicted in FIG. 23. The screen 124 displays the primary webpage 134 (showing the tax return preparation web browser 122) without a secondary webpage overlay. The identified total property tax paid has been imported into the primary webpage 134 and the primary webpage 134 is accessible to proceed with tax return preparation.

During the process depicted in FIGS. 17-24, the machine learning system 140 operates in the background (i.e., invisible to the user) to read and store user input (e.g., interface data) and, in some cases, responses from the property tax data source for analysis as described below. While the secondary webpages 138 in FIGS. 17-24 display only webpages rendered according to instructions from the tax data source program 116, the tax data acquisition system 102 may also display annotation user interface objects overlaid on top of the tax data source program webpages. For instance, an annotation user interface object may be an arrow and/or text directing a user to select a user interface object from a tax data source program webpage to acquire tax data. The tax data acquisition system 102 may also display download authorization user interface objects configured to allow a user to authorize download of tax data from the user interface 112 (e.g., to the web engine 114). While the secondary webpages 138 are displayed in modal windows in FIGS. 17-24, the secondary webpages 138 may be side-by-side windows, such that a user can manually switch between active windows.

Figure 25:
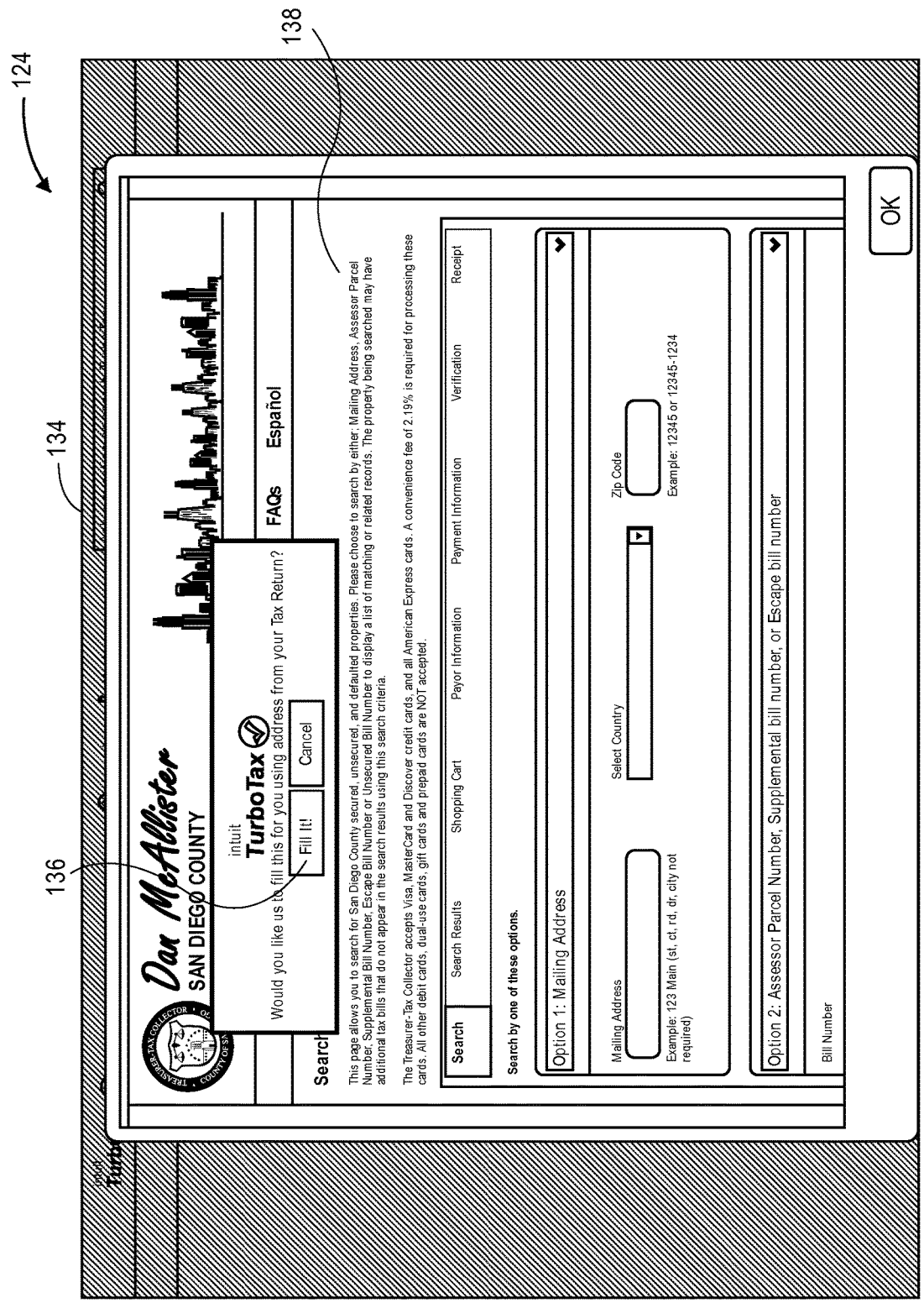

FIG. 25 depicts the screen 124 after a second user enters the zip code of a property for which property tax was paid and selects the user interface object 136 as shown in FIG. 17. The system 102 has navigation information for the source of the property tax information because the second user entered the same zip code as the user entered in FIG. 17. In response, the screen 124 displays a secondary webpage 138 (showing a property tax search webpage of the particular county tax collector website for the entered zip code) overlaying a primary webpage 134 (showing a tax return preparation web browser 122). The system 102 navigated to this page by using the navigation information derived from the interactions depicted in FIGS. 17-24. In this embodiment, the secondary webpage 138 is rendered in a modal window overlaying the primary webpage 134. Therefore, the primary webpage 134 remains open, but is shaded and inaccessible, until the modal secondary webpage 138 is closed. The secondary webpage 138 in FIG. 25 also displays a user interface object 136 prompting the user to confirm autofill of the property tax search webpage with previously provided (or obtained) user information (e.g., address).

When the user confirms autofill of the property tax search webpage depicted in FIG. 25, the system 102 automatically accesses previously obtained user information and completes the parameters in the property tax search webpage. The system 102 can then identify the total property tax paid using the previously derived navigation information, and import the total property tax paid into the tax return preparation program 120. The system 102 can perform these automatic data acquisition steps with or without prompting the user to confirm some or all of the steps. In this manner, the system 102 facilitates acquisition of property tax data with a minimal amount of user input using previously derived navigation information and previously obtained user information.

Having described various aspects of tax data acquisition systems 102 according to various embodiments, computer-implemented methods for acquiring tax data using the tax data acquisition systems 102 will now be described.

Figure 26:
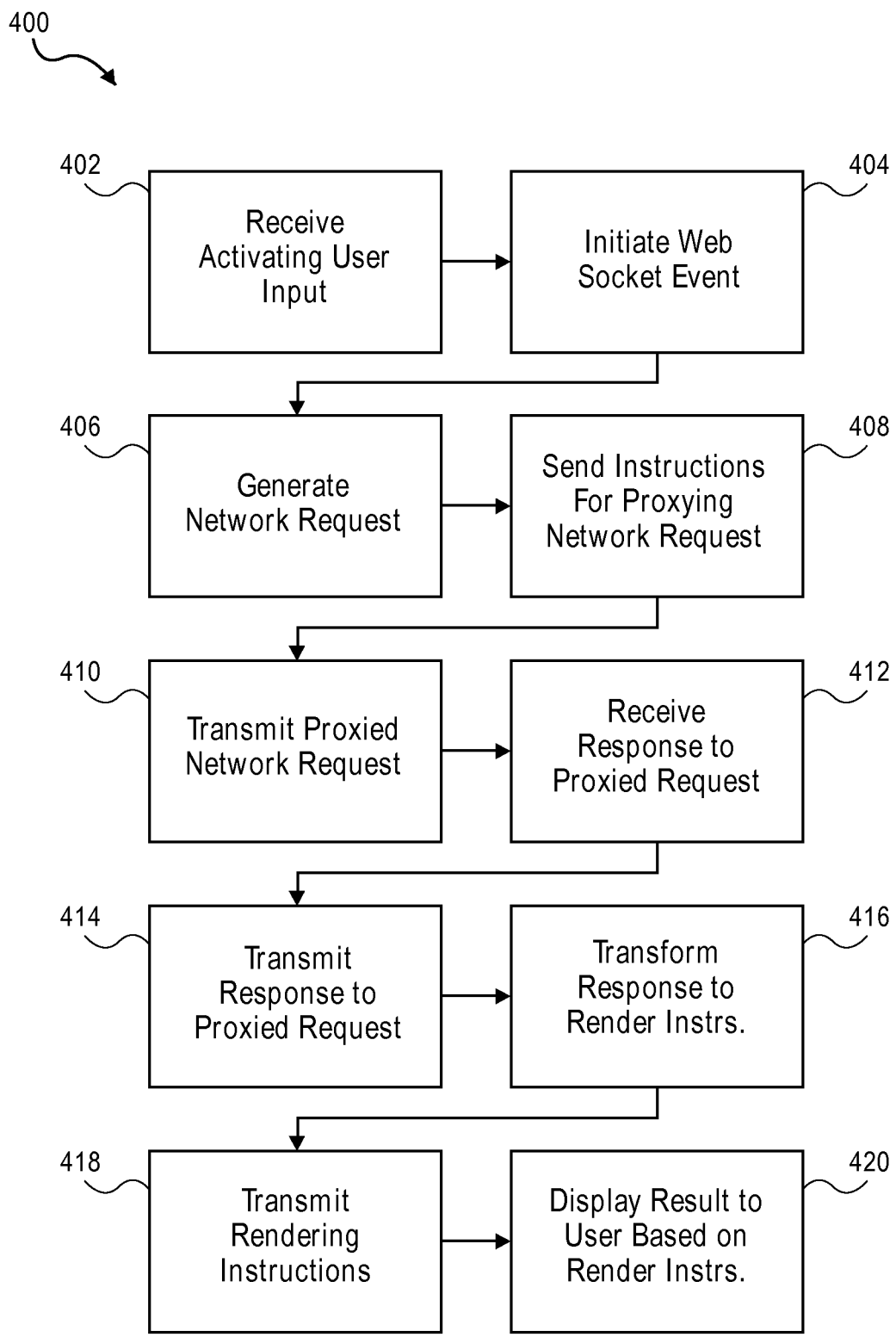
FIGS. 26 to 32 are flow charts depicting computer implemented methods of acquiring tax data according to various embodiments.

FIG. 26 depicts a computer-implemented method 400 executed according to one embodiment by a system 100, 300 including a tax data acquisition system 102 and a tax data source program 116, as shown in FIGS. 1 and 9 for example. The tax data acquisition system 102 can include a user interface 112 running on a client computer 104 and a web engine 114 running on a remote browser server computer 106. Alternatively, the user interface 112 and the web engine 114 can run on the same computing device. The tax data source program 116 runs on a third party computer 108. The user interface 112 and the web engine 114 are communicatively coupled by a network 110. Further, the user interface 112 and the tax data source program 116 are communicatively coupled by the network 110.

At step 402, the system 100, 300 receives user input activating the tax data acquisition system 102. For instance, the activating user input may be selection of a user interface object 136 as shown in FIGS. 14 and 18 for example. The user interface object 136 may be part of a primary webpage 134 displaying a tax return preparation web browser 122 of a tax return preparation program 120. The user input directs the system 100, 300 to obtain tax information (e.g., a W-2 form) from a tax data source program 116 (e.g., a third party payroll program) running on a tax data source computer 108.

At step 404, the user interface 112 initiates a web socket event to the web engine 114 via the network 110 in response to the activating user input. At step 406, the web engine 114 generates a network request based on the web socket event. For example, the network request may be an HTML or a CCS request resulting in the login screen in FIG. 12. At step 408, the web engine 114 transmits instructions for proxying the network request to the user interface 112.

At step 410, the user interface 112 transmits the proxied network request to the tax data source program 116 via the network 110. Examples of tax data source programs 116 include, but are not limited to, those associated with payroll processors (as in FIG. 12), bank accounts, investment accounts, and collectors of deductible tax payments (e.g., property tax). At step 412, the user interface 112 receives a response to the proxied network request from the tax data source program 116 via the network 110. The response may be interface data including HTML code describing the content and format of a webpage to be displayed (e.g., the webpage 138 in FIG. 12).

At step 414, the user interface 112 transmits the proxied request response to the web engine 114 via the network 110. At step 416, the web engine 114 processes the proxied request response to render a next webpage or sequence by generating rendering instructions. At step 418, the web engine 114 transmits the rendering instructions to the user interface 112 via the network 110. At step 420, the user interface 112 displays the result of the proxied request response based on the rendering instructions.

In the method 400 depicted in FIG. 26, the coupling of the user interface 112 and the web engine 114 may not be detectable by the tax data source program 116. In other words, interactions between the user interface 112 and the web engine 114 may be invisible to the tax data source program 116.

Figure 27:
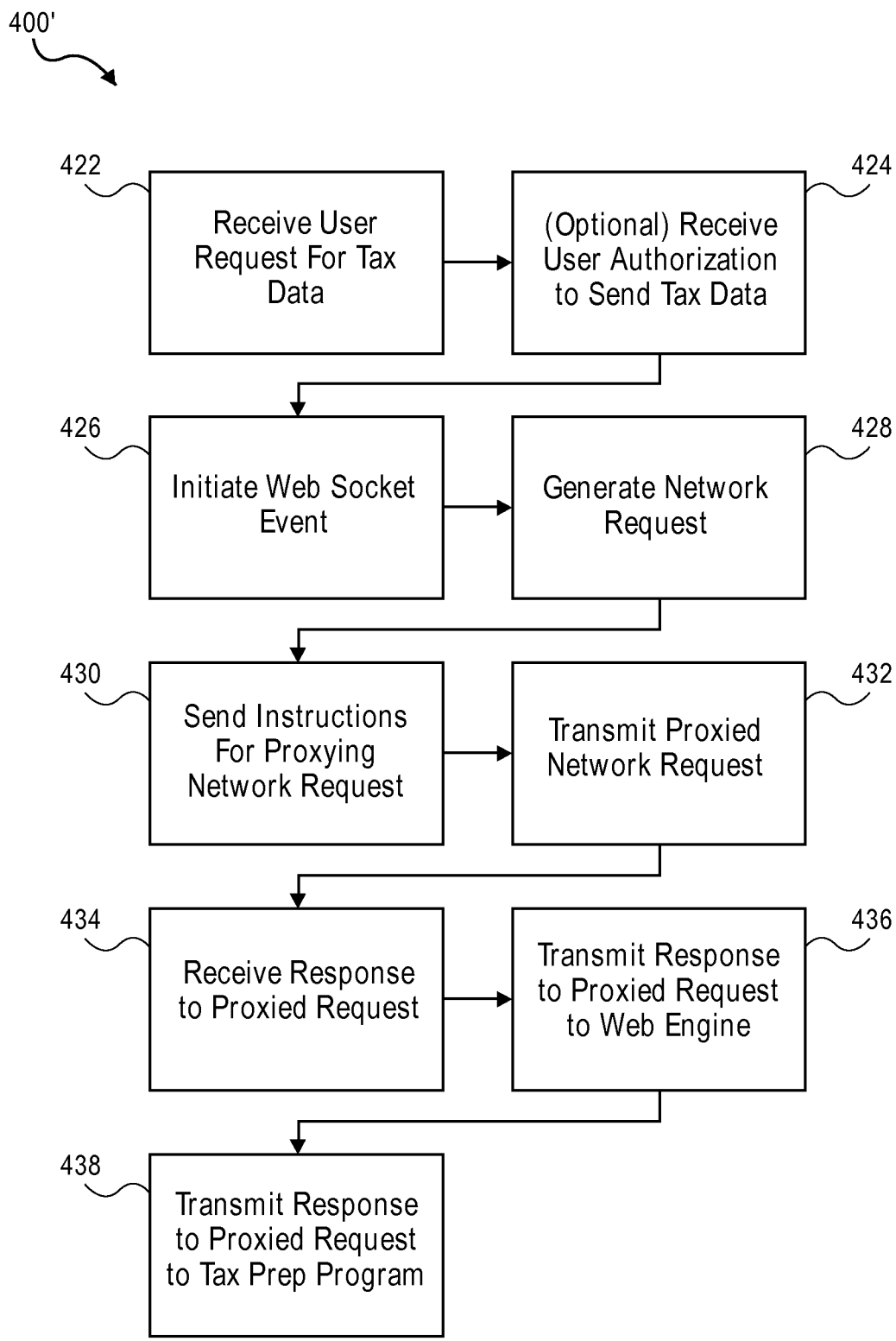

FIG. 27 depicts a computer-implemented method 400' executed according to one embodiment by a system 100, 300 including a tax data acquisition system 102, a tax data source program 116, and a tax return preparation program 116, as shown in FIG. 3 for example. The tax data acquisition system 102 can include a user interface 112 running on a client computer 104 and a web engine 114 running on a remote browser server computer 106. Alternatively, the user interface 112 and the web engine 114 can run on the same computing device. The tax data source program 116 runs on a third party computer 108. The tax return preparation program 116 runs on a tax return preparation computer 118. The user interface 112 and the web engine 114 are communicatively coupled by a network 110. Further, the user interface 112 and the tax data source program 116 are communicatively coupled by the network 110. Moreover, the web engine 114 and the tax return preparation program 116 are communicatively coupled by the network 110.

At step 422, the system 100, 300 receives a user request for tax data. For instance, the user request may be selection of a user interface object 136 associated with tax data (a W-2 form as shown in FIG. 16 or total property tax paid as shown in FIG. 23). The user interface object 136 may be part of a secondary webpage 138 emulating a webpage of a tax data source program 116. Annotating user interface objects (not shown) may be overlaid on top of the secondary webpage 138 to guide a user to the user interface object 136 associated with the tax data. The method described below (see FIGS. 30-32) leverages the user's navigation of the tax data source program 116 to for the system 100, 300 to "learn" the steps needed to acquire the tax data. Accordingly, these user commands may also be sent to a machine learning system 140 for storage with user authorization.

At step 424, the system 100, 300 optionally requests and receives user authorization to send the tax data to the tax return preparation program 116 and/or a machine learning system 140. User authorization provided at this point in the process typically only applies to the tax data associated with the user interface object 136. User authorization may not be required at this point in the process (e.g., if user authorization for a general class of tax data was previously provided).

At step 426, the user interface 112 initiates a web socket event to the web engine 114 via the network 110 in response to the user tax data request. At step 428, the web engine 114 generates a network request based on the web socket event. For example, the network request may be an HTML or a CCS request resulting downloading of a W-2 form (e.g., in PDF format) or a total amount of property tax paid. At step 430, the web engine 114 transmits instructions for proxying the network request to the user interface 112.

At step 432, the user interface 112 transmits the proxied network request to the tax data source program 116 via the network 110. Examples of tax data source programs 116 include, but are not limited to, those associated with payroll processors (as in FIG. 12), bank accounts, investment accounts, and collectors of deductible tax payments (e.g., property tax). At step 434, the user interface 112 receives a response to the proxied network request from the tax data source program 116 via the network 110. The response may be tax data (e.g., a PDF of a W-2 form or a total amount of property tax paid).

At step 436, the user interface 112 transmits the proxied request response (e.g., the W-2 form or a total amount of property tax paid) to the web engine 114 via the network 110. At step 438, the web engine 114 transmits the proxied request response (e.g., the W-2 form or a total amount of property tax paid) to the tax return preparation program 120.

In the method 400' depicted in FIG. 27, the coupling of the user interface 112, the web engine 114, and the tax return preparation program 120 may not be detectable by the tax data source program 116. In other words, interactions between the user interface 112, the web engine 114, and the tax return preparation program 120 may be invisible to the tax data source program 116.

Figure 28:
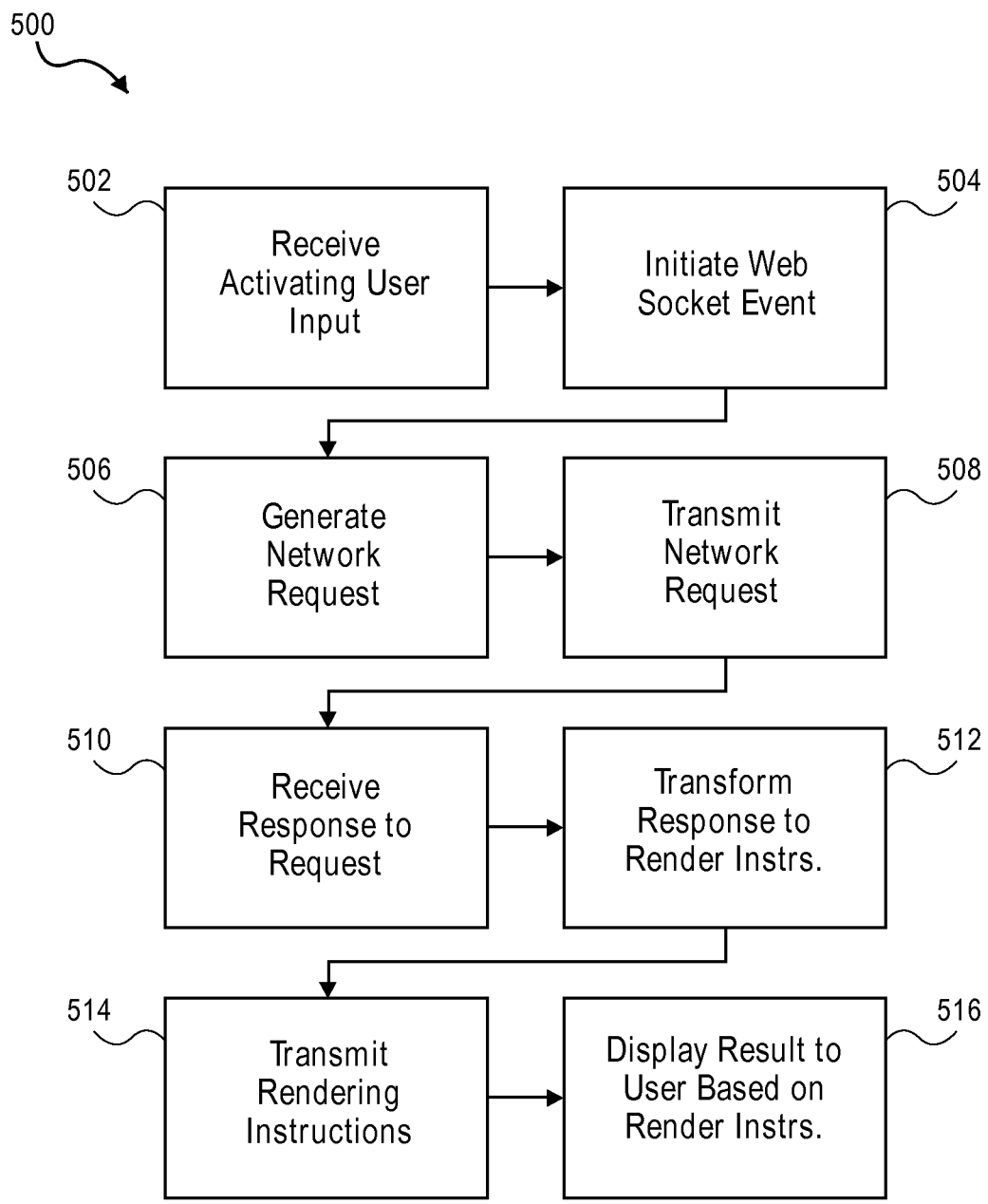

FIG. 28 depicts a computer-implemented method 500 executed according to one embodiment by a system 100, 300 including a tax data acquisition system 102 and a tax data source program 116, as shown in FIGS. 1 and 10. The tax data acquisition system 102 can include a user interface 112 running on a client computer 104 and a web engine 114 running on a remote browser server computer 106. Alternatively, the user interface 112 and the web engine 114 can run on the same computing device. The tax data source program 116 runs on a third party computer 108. The user interface 112 and the web engine 114 are communicatively coupled by a network 110. Further, the web engine 114 and the tax data source program 116 are communicatively coupled by the network 110.

At step 502, the system 100, 300 receives user input activating the tax data acquisition system 102. For instance, the activating user input may be selection of a user interface object 136 as shown in FIGS. 14 and 18. The user interface object 136 may be part of a primary webpage 136 displaying a tax return preparation web browser 122 of a tax return preparation program 120. The user input directs the system 100, 300 to obtain tax information (e.g., a W-2 form) from a tax data source program 116 (e.g., a third party payroll program) running on a tax data source computer 108.

At step 504, the user interface 112 initiates a web socket event to the web engine 114 via the network 110 in response to the activating user input. At step 506, the web engine 114 generates a network request based on the web socket event. For example, the network request may be an HTML or a CCS request resulting in the login screen in FIG. 12.

At step 508, the web engine 114 transmits the network request to the tax data source program 116 via the network 110. Examples of tax data source programs 116 include, but are not limited to, those associated with payroll processors (as in FIG. 12), bank accounts, investment accounts, and collectors of deductible tax payments (e.g., property tax). At step 510, the web engine 114 receives a response to the network request from the tax data source program 116 via the network 110. The response may be interface data including HTML code describing the content and format of a webpage to be displayed (e.g., the webpage 138 in FIG. 12).

At step 512, the web engine 114 processes the request response to render a next webpage or sequence by generating rendering instructions. At step 514, the web engine 114 transmits the rendering instructions to the user interface 112 via the network 110. At step 516, the user interface 112 displays the result of the request response based on the rendering instructions.

Figure 29:
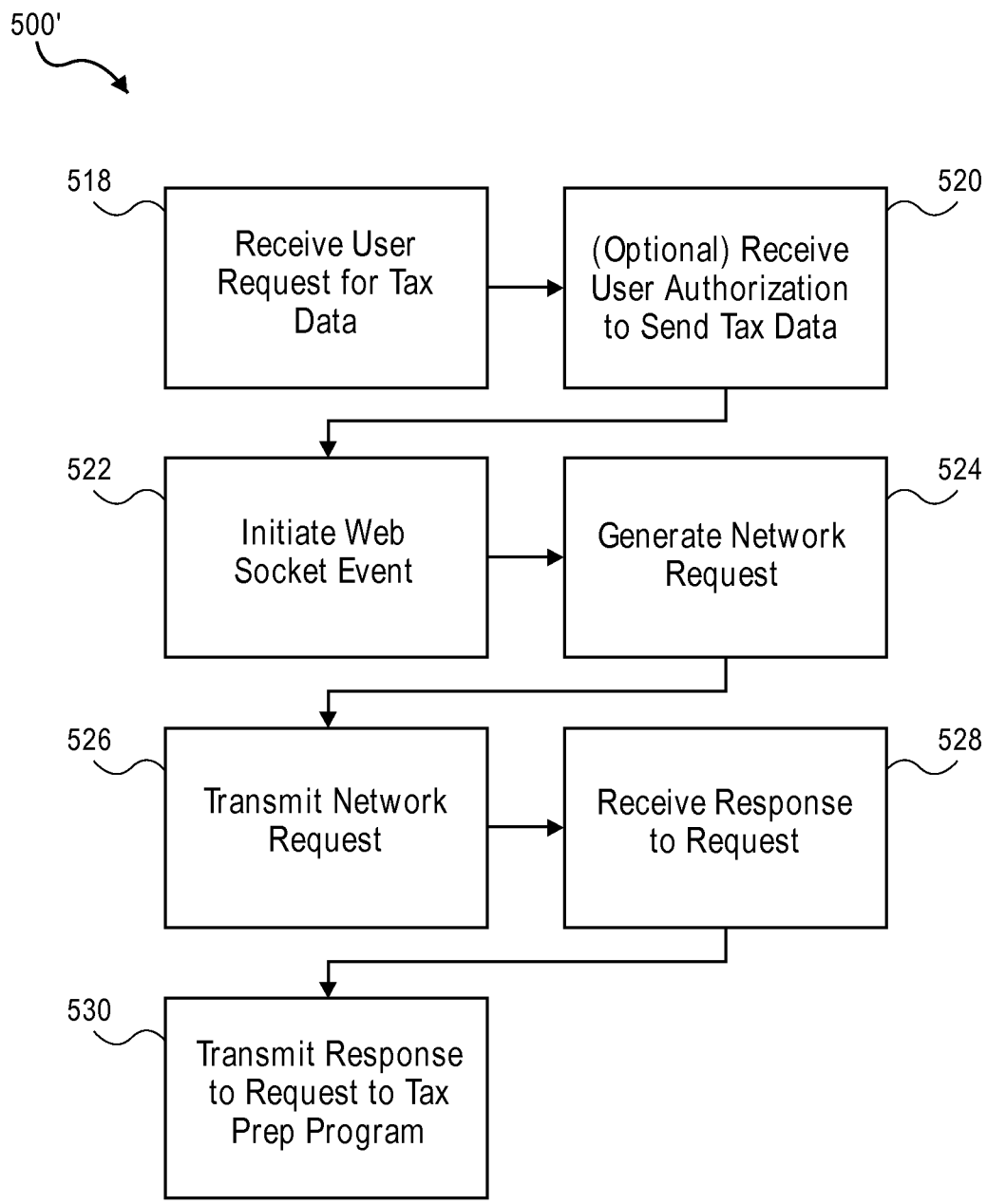

FIG. 29 depicts a computer-implemented method 500' executed according to one embodiment by a system 100, 300 including a tax data acquisition system 102, a tax data source program 116, and a tax return preparation program 116, as shown in FIG. 3 for example. The tax data acquisition system 102 can include a user interface 112 running on a client computer 104 and a web engine 114 running on a remote browser server computer 106. Alternatively, the user interface 112 and the web engine 114 can run on the same computing device. The tax data source program 116 runs on a third party computer 108. The tax return preparation program 116 runs on a tax return preparation computer 118. The user interface 112 and the web engine 114 are communicatively coupled by a network 110. Further, the web engine 114 and the tax data source program 116 are communicatively coupled by the network 110. Moreover, the web engine 114 and the tax return preparation program 116 are communicatively coupled by the network 110.

At step 518, the system 100, 300 receives a user request for tax data. For instance, the user request may be selection of a user interface object 136 associated with tax data (a W-2 form as shown in FIG. 16 or total property tax paid as shown in FIG. 23). The user interface object 136 may be part of a secondary webpage 138 emulating a webpage of a tax data source program 116. Annotating user interface objects (not shown) may be overlaid on top of the secondary webpage 138 to guide a user to the user interface object 136 associated with the tax data. The method described below (see FIGS. 30-32) leverages the user's navigation of the tax data source program 116 to for the system 100, 300 to "learn" the steps needed to acquire the tax data. Accordingly, these user commands may also be sent to a machine learning system 140 for storage with user authorization.

At step 520, the system 100, 300 optionally requests and receives user authorization to send the tax data to the tax return preparation program 116 and/or a machine learning system 140. User authorization provided at this point in the process typically only applies to the tax data associated with the user interface object 136. User authorization may not be required at this point in the process (e.g., if user authorization for a general class of tax data was previously provided).

At step 522, the user interface 112 initiates a web socket event to the web engine 114 via the network 110 in response to the user tax data request. At step 524, the web engine 114 generates a network request based on the web socket event. For example, the network request may be an HTML or a CCS request resulting downloading of a W-2 form (e.g., in PDF format or a total amount of property tax paid).

At step 526, the web engine 114 transmits the network request to the tax data source program 116 via the network 110. Examples of tax data source programs 116 include, but are not limited to, those associated with payroll processors (as in FIG. 12), bank accounts, investment accounts, and collectors of deductible tax payments (e.g., property tax). At step 528, the web engine 114 receives a response to the network request from the tax data source program 116 via the network 110. The response may be tax data (e.g., a PDF of a W-2 form or a total amount of property tax paid). At step 530, the web engine 114 transmits the request response (e.g., the W-2 form) to the tax return preparation program 120 and/or the machine learning system 140.

Figure 30:
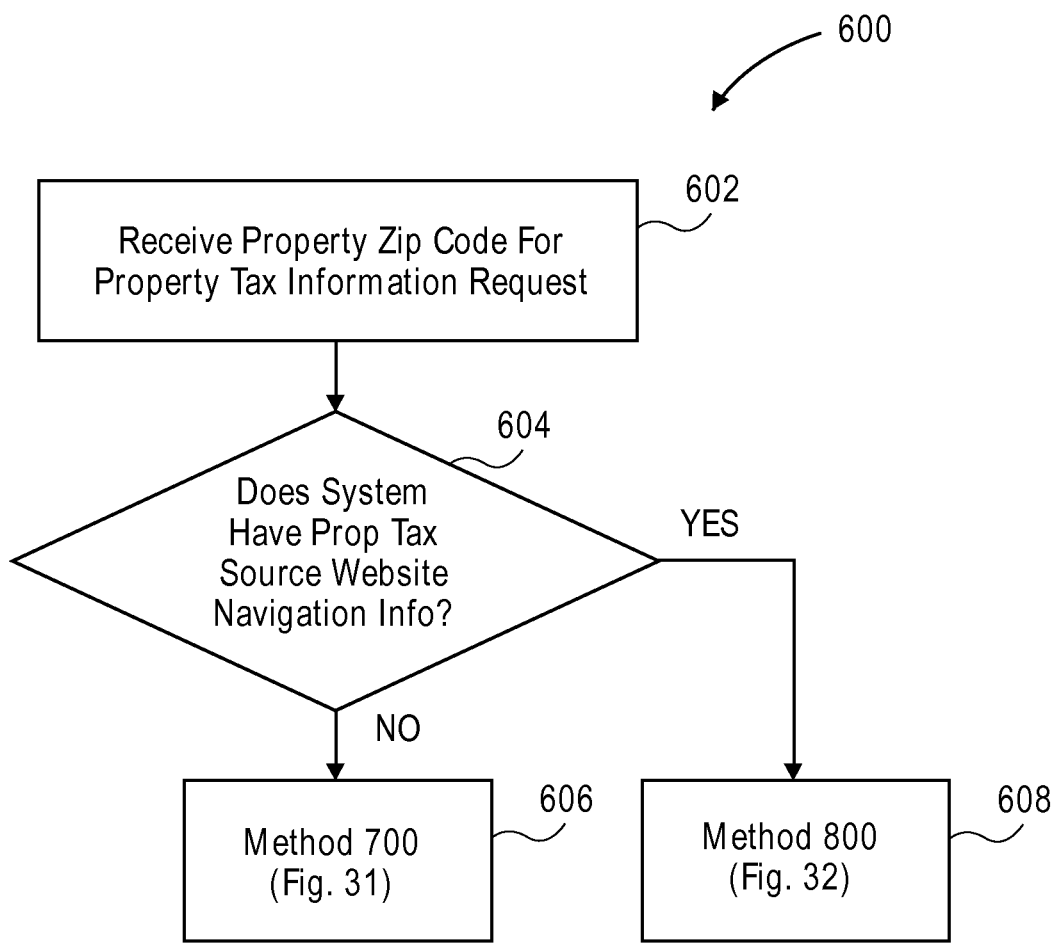
Figure 31:
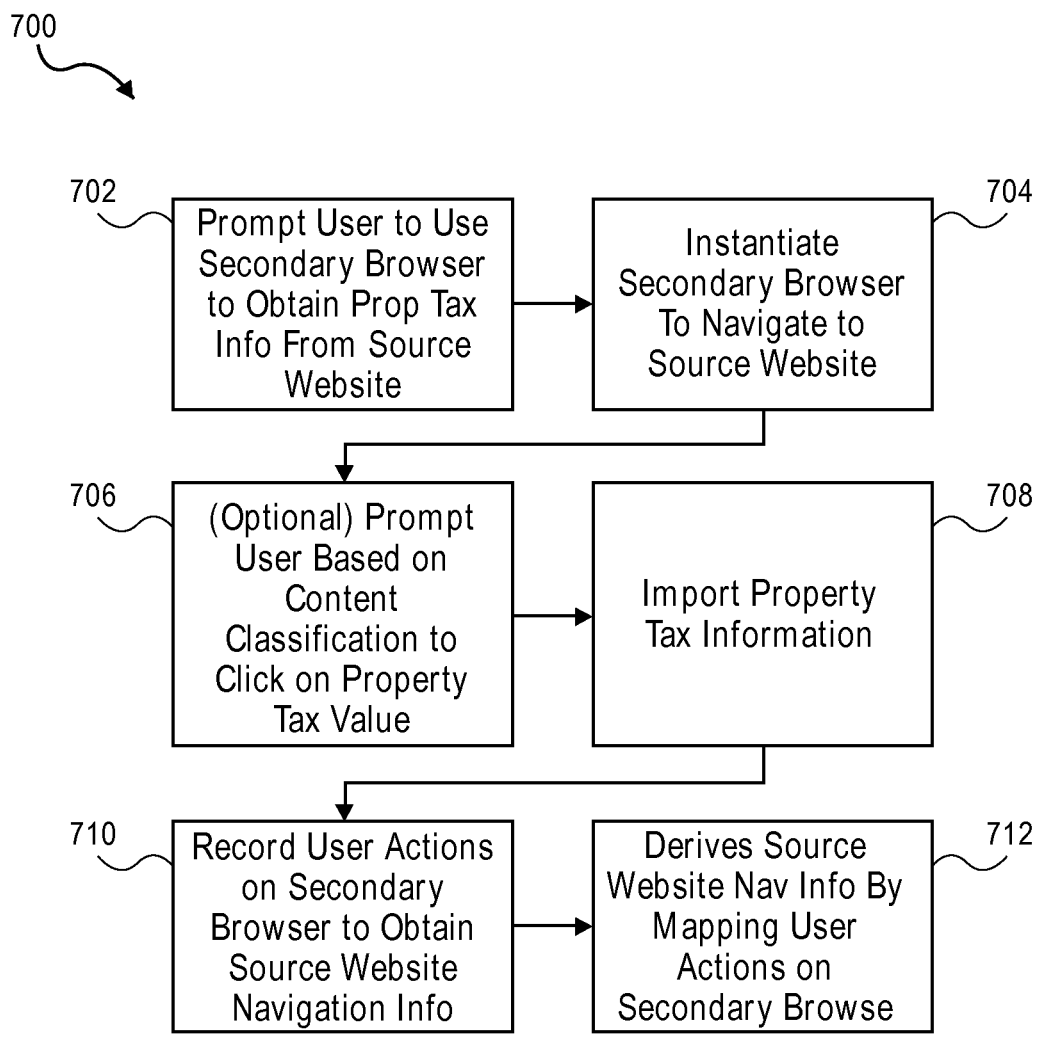
Figure 32:
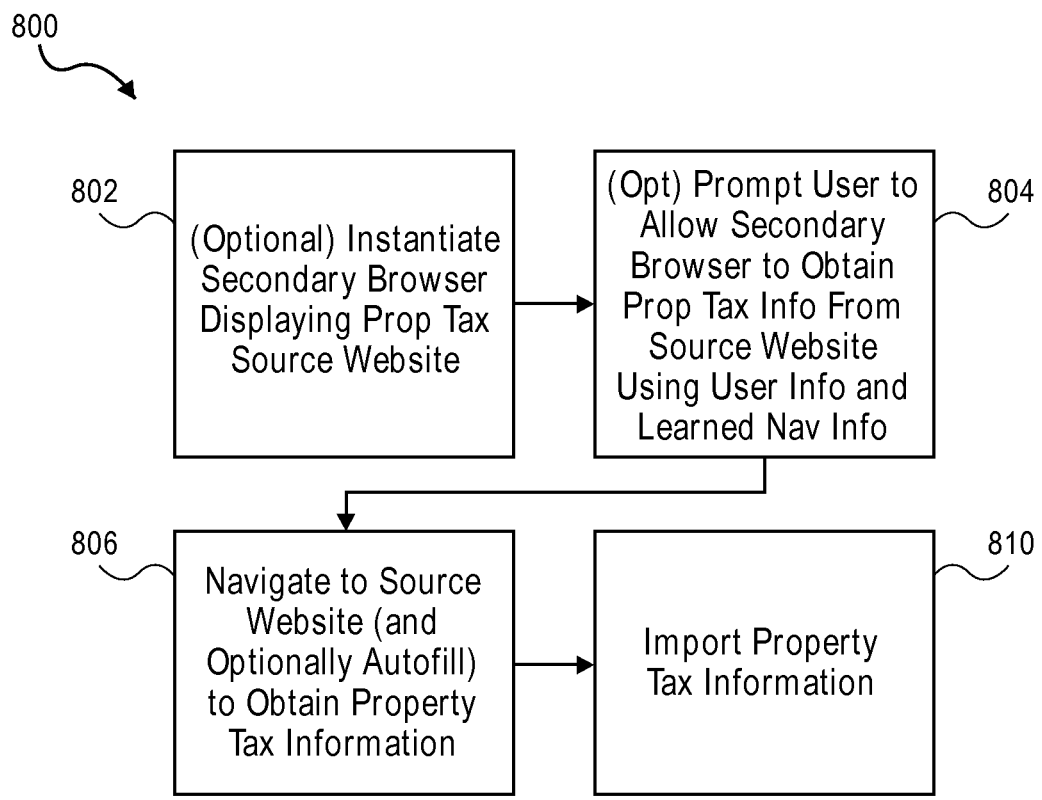

FIGS. 30-32 depict related computer-implemented methods 600, 700, 800 executed according to one embodiment by a system 100, 300 including a tax data acquisition system 102, a tax data source program 116, and a tax return preparation program 116, as shown in FIG. 3 for example. The tax data acquisition system 102 can include a user interface 112 running on a client computer 104, and a web engine 114 and a machine learning system 140 running on a remote browser server computer 106. Alternatively, the user interface 112 and the web engine 114 can run on the same computing device. The tax data source program 116 runs on a third party computer 108. The tax return preparation program 116 runs on a tax return preparation computer 118. The user interface 112 and the web engine 114 are communicatively coupled by a network 110. The web engine 114 and the machine learning system 140 are communicatively coupled by a bus. Further, the user interface 112 and the tax data source program 116 are communicatively coupled by the network 110. Moreover, the web engine 114 and the tax return preparation program 116 are communicatively coupled by the network 110.

In particular, the methods 600, 700, 800 are executed to acquire tax data (i.e., total property tax paid) using the system 100, 300. FIGS. 17-25 depict various screens 124 displayed during execution of the methods 600, 700, 800.

FIG. 30 depicts a method 600 early in the group of methods 600, 700, 800 that is common to all users executing the group of methods 600, 700, 800. A related screen 124 is depicted in FIG. 17.

At step 602, the system 100, 300 receives a zip code for a property for which total property tax paid (per year) is requested. FIG. 17 depicts a screen 124 in which the zip code is entered in a user interface object 136, as described above. The screen 124 may be of a client computer 104 displaying a tax return preparation web browser 122 of a tax return preparation program 120 in a primary webpage 134. The zip code may have been filled into the user interface object 136 manually by the user or automatically by the tax return preparation program 120. Annotating user interface objects (not shown) may be overlaid on top of the primary webpage 134 to guide a user to the user interface object 136 associated with the zip code.

Receiving the zip code may imply authorization to acquire the total property tax paid for that property. Alternatively, authorization may have been provided early in the method 600. In any case, the received zip code is sent to a machine learning system 140 for analysis.

At step 604, the machine learning system 140 determines whether the system 100, 300 has navigation information sufficient to acquire property tax data from the property tax source website associated with the received zip code. As used in this application, "navigation information" includes, but is not limited to, information that facilitates interaction with a website. If the result of the step 604 determination is that the system 100, 300 does not have sufficient navigation information for the property tax source website, the process moves onto method 700 depicted in FIG. 31 and described below. If the result of the step 604 determination is that the system 100, 300 does have sufficient navigation information for the property tax source website, the process moves onto method 800 depicted in FIG. 32 and described below. Steps 604, 606, and 608 are invisible to the user (i.e., in the background).

In one embodiment, the machine learning system 140 can make the determination at step 604 using a target classification engine 146. The target classification engine 146 can determine whether two websites are substantially similar to each other, as defined above. One heuristic for determining whether two websites are substantially similar is to (1) treat each website as a separate tree structure and (2) performing an edit-distance computation on the two trees. The result of the edit-distance computation is a difference parameter. When the difference parameter computed for two websites is greater than a predetermined difference parameter, the difference is considered "acceptable" and the websites are determined to be substantially similar. This heuristic removes the noise from the website similarity determination.

FIG. 31 depicts a method 700 for acquiring total property tax paid, and for deriving navigation information for the property tax source website for the zip code specific to the tax data request when the system 100, 300 does not have sufficient navigation information for the property tax source website (FIG. 30, step 606). Related screens 124 are depicted in FIGS. 18-24.

At step 702, the system 100, 300 prompts the user to obtain property tax information from the property tax source website. FIG. 18 depicts a screen 124 displaying a user interface object 136 for prompting the user to navigate to the property tax source website, as described above. Selecting the user interface object 136 initiates a process through which the user will navigate (e.g., using a search engine) to the property tax source website.

At step 704, the system 100, 300, in response to the user selection of the user interface object 136 in FIG. 18, instantiates a secondary browser (i.e., relative to the primary tax preparation browser 122) to facilitate navigation to the property tax source website. As shown in FIGS. 19 and 20, the secondary browser first displays a search engine landing page as a secondary webpage 138, which the user utilizes to identify and navigate to the property tax source website for the relevant property zip code. While the interface object 136 for web search data in the landing page is blank in FIG. 19, the landing page may be pre-filled with some user provided information in other embodiments. Then, as shown in FIGS. 21 and 22, the secondary browser first displays a property tax source webpage as a secondary webpage 138, which the user utilizes to identify the total property tax paid (e.g., by entering address information as shown in FIG. 21). FIG. 22 depicts the screen 124 showing a property tax record (e.g., for a property corresponding to an entered address).

At step 706, the system 100, 300 may optionally prompt the user to click on the total property tax paid. The system 100, 300 may identify the total property tax paid using content classification as described in U.S. patent application Ser. No. 14/871,802, filed Sep. 30, 2015, entitled "WEB BROWSING AND MACHINE LEARNING SYSTEMS FOR ACQUISITION OF TAX DATA DURING PREPARATION OF ELECTRONIC TAX RETURN," the contents of which were previously incorporated by reference.

At step 708, the system 100, 300 imports the identified total property tax paid into the tax preparation program 120. As shown in FIG. 23, the system 100, 300 may request user authorization to import the identified total property tax paid. As shown in FIG. 24, the system 100, 300 may confirm importation of the identified total property tax paid.

In addition to instantiating a secondary browser for navigation, selecting the user interface object 136 in FIG. 18 also initiates a machine learning process (by the machine learning system 140) based on user navigation. When the machine learning process is initiated, the action recorder 142 is activated to read and store the user-provided interface data (i.e., user input) for analysis, as shown in step 710. As used in this application, "user input" includes, but is not limited to mouse clicks, keyboard events, form submissions, and page navigations. The action recorder 142 may also filter out a non-relevant events, such as mouse clicks on non-link elements and scrolling events.

In step 712, the system 100, 300 derives navigation information for the property tax source website by mapping of actions taken by the user on the secondary browser. The navigation sequence detector 144 analyzes the stored user-provided interface data to derive navigation information for the property tax source website. The machine learning system 140 (e.g., the navigation sequence detector 144) runs in the background (i.e., invisible to the user) to analyze the interface data from the user and in some cases interface data from the property tax source website.

While FIG. 31 and FIGS. 17-24 illustrate analysis of interface data for only one user, the machine learning system 140 in other embodiments can analyze interface data provided by a plurality of users on the same property tax source website to derive navigation information for the property tax source website. For instance, the machine learning system 140 can derive the navigation information by generalizing interface data from a plurality of users. The machine learning system 140 can also derive the navigation information by analyzing the states of property tax source webpages generated during navigation by respective users. In some embodiments, the navigation sequence detector 144 includes a branch detector, which determines when two webpages have different configurations, but respective user interactions on the webpages result in a webpage having the same state. Such branches can be collapsed to simplify the navigation information. In other embodiments, the machine learning system 140 can analyze interface data provided by a plurality of users on the different property tax source websites to derive general navigation information for property tax source websites.

FIG. 32 depicts a method 800 for acquiring total property tax paid from a property tax source website when the system 100, 300 does have sufficient navigation information for the property tax source website (FIG. 30, step 608). A related screen 124 is depicted in FIG. 25. The method 800 can be performed completely automatically because the system 100, 300 has the navigation information and (in some embodiments) user information it needs to acquire the total property tax paid. However, method 800 includes several optional steps that give the user a certain amount of control over the data acquisition process.

As step 802, the system 100, 300 optionally instantiates a secondary browser displaying the property tax source website. The system 100, 300 can navigate to this website using previously derived and obtained navigation information and user information. The system 102 has navigation information for the property tax source website because the user entered a zip code for which navigation information was previously derived (e.g., using a method similar to the one depicted in FIG. 31). The user information may have been previously entered by the user during tax preparation or obtained (after authorization) from other sources of user information (e.g., financial management systems, tax returns, etc.)

At step 804, the system 100, 300 optionally prompts the user to allow the secondary browser to obtain the total property tax paid using the previously derived and obtained navigation information and user information. FIG. 25 depicts a screen 124 showing a property tax search webpage of the particular county tax collector website for the entered zip code in a secondary browser. FIG. 25 also depicts a user interface object 136 prompting the user to confirm autofill of the property tax search webpage with previously provided (or obtained) user information (e.g., address).

At step 806, the system 100, 300 (after confirmation) navigates to the property tax source website and fills parameterized fields in the property tax source website to obtain the total property tax paid. Filling the fields can be done manually by the user, semi-automatically, or automatically, after appropriate authorization by the user. At step 810, the system 100, 300 imports the identified total property tax paid into the tax preparation program 120. The system 100, 300 may request user authorization to import the identified total property tax paid. Also, the system 100, 300 may confirm importation of the identified total property tax paid.

The system 100, 300 navigates through the property tax source website and fills fields therein with user information by using a playback engine 150, which is configured to interact with a website using previously derived navigation information and previously obtained user information. In one embodiment, the system 100, 300 utilizes a parameter detector 148 to process the property tax source website in step 806. The parameter detector 148 scans a website and identifies parameters (e.g., by detecting HTTP POST requests or onblur events.) Examples of parameters include user names and passwords. The parameter detector 148 then filters the parameters out of the version of the website before adding using information into the parameter fields. Filtering the parameters removes hidden machine generated parameters such as CSRF tokens.

Using navigation information derived from the interactions of a plurality of users with a tax data source website leverages the large number of users to derive more accurate and precise navigation instructions for the website by applying crowdsourcing principles to machine learning. Further, monitoring user interactions, even when the system 100, 300 has determined that it has acceptable navigation information for a website can identify slight changes in the website that may require new or updated navigation instructions (e.g., for instance, when a user declines to confirm automated data entry because the acquired data is incorrect). In this manner, the system 102 facilitates acquisition of tax data with a minimal amount of user input using previously derived navigation information and previously obtained user information.

The methods 400, 400', 500, 500', 600, 700, 800 depicted in FIGS. 26-32 involve interactions between a tax data acquisition system 102 (a user interface 112, a web engine 114, and a machine learning system 140), a tax data source program 116, and a tax return preparation program 116. The networked communications between these system components occur in real-time, such that the user's experience is one of a secondary webpage 138 opened within a primary webpage 134, with no noticeable time lag in accessing the tax data source program 116 using the secondary webpage 138. The secondary webpage 138 can be a modal window in the primary webpage 134 such that the primary webpage 134 remains open, but is inaccessible, until the modal secondary webpage 134 is closed. The system 102 may also be sandboxed on the client computer 104 to limit access to resources thereon.

While certain embodiments have been described with reference to tax data acquisition for a new user, embodiments are not so limited. Other embodiments may involve a user who has previously prepared a tax return associated with a particular unique tax ID number. User information, such as security credentials/authentication information for the user and tax ID number from a previous tax year may have been previously provided by the user and stored by the tax return preparation program 120. In such embodiments, the tax data acquisition system 102 may function autonomously or semi-autonomously, e.g., by using the previously provided security credentials to either automatically or semi-automatically access the tax data. In embodiments where the tax data is automatically accessed, the secondary webpage may only be executed (i.e., instantiated) without being rendered or displayed to the user. In other words, the tax data acquisition system 102 may instantiate the secondary webpage (e.g., a tax data acquisition session) and may use the previously provided security credentials to access the tax data without displaying the secondary webpage to or involving the user. In order to facilitate tax return preparation program 120 collection of user information, the tax data acquisition system 102 may display user interface objects configured to allow a user to authorize collection of user information by the tax return preparation program 120.

While FIGS. 17-25 and 30-32 depict embodiments for acquiring property tax data, the described methods are not so limited. Further, while embodiments have been described for acquiring tax data for use by tax return preparation programs, other embodiments include systems and methods for collecting third party data in general. For instance, embodiments include systems and methods for navigating, accessing, obtaining, and collecting third party data in the form of financial data for financial programs including bill payment programs (such as online banking programs) and financial management systems (such as MINT or QUICKEN financial management systems).

Such systems and methods would have similar construction and function as the systems and methods for acquiring tax data described above. For instance, such financial data acquisition systems may include the following elements: a financial data acquisition system (analogous to the tax data acquisition system 102); a financial data source computer (analogous to the tax data source computer 108); a network 110; a user interface 112; a machine learning system 140; a financial data acquisition program (analogous to the web engine 114); a financial data source program (analogous to the tax data source program 116); and a financial program (analogous to the tax return preparation program 120).

Further, sources of data for financial programs (e.g., financial management systems) include, but are not limited to, an account the user has with an online social media website, third parties databases or resources (such as government databases or documents, such as property tax records, Department of Motor Vehicle (DMV) records and US Census data) and other external sources. MINT and QUICKEN are registered trademarks of Intuit Inc., Mountain View, Calif.

Where methods and steps described above indicate certain events occurring in certain order, those of ordinary skill in the art having the benefit of this disclosure would recognize that the ordering of certain steps may be modified and that such modifications are in accordance with the variations of the disclosed embodiments. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computerized system for acquiring tax data during preparation of an electronic tax return, the system comprising:

a client computer executing a browser and being configured to present a tax preparation webpage of a tax preparation application utilized to prepare the electronic tax return, and receive interface data from a first user for a first tax data source website of a tax data source program hosted by a tax data source computer, wherein the interface data represents the first user's interactions with the first tax data source website;

a browser rendering computer in communication with the client computer; and a machine learning system utilized by the browser rendering computer, the browser rendering computer being configured to receive the interface data from the client computer, execute the machine learning system utilizing the received interface data as an input, derive navigation information for the first tax data source website based at least in part upon a result generated by the machine learning system, generate rendering instructions for the first tax data source website, and transmit the rendering instructions to the client computer, and the client computer being further configured to execute the rendering instructions to implement a second browser that presents a tax data source webpage based at least in part upon the rendering instructions and the interface data, the client computer rendering the presented tax data source webpage such that the rendered tax data source webpage overlaps the tax preparation webpage, the tax data source webpage being controllable by a user independently of the tax preparation webpage, the machine learning system further comprising a target classification engine configured to determine whether a second tax data source website is substantially similar to the first tax data source website and a playback engine configured to interact with the second tax data source website using the navigation information and user information provided by a second user.

2. The system of claim 1, wherein the interface data is selected from the group consisting of mouse clicks, keyboard events, form submissions, and page navigations.

3. The system of claim 1, the machine learning system comprising:

an action recorder configured to read and store the interface data; and a navigation sequence detector configured to analyze the interface data to derive the navigation information for the first tax data source website.

4. The system of claim 3, wherein the action recorder is also configured to filter out a non-relevant event.

5. The system of claim 4, wherein the non-relevant event is selected from the group consisting of mouse clicks on non-link elements and scrolling events.

6. The system of claim 3, wherein the action recorder is also configured to read and store respective interface data from a plurality of users on the first tax data source website.

7. The system of claim 6, wherein the navigation sequence detector is also configured to analyze the respective interface data to derive the navigation information for the first tax data source website.

8. The system of claim 7, wherein analyzing the respective interface data comprises generalizing the respective interface data.

9. The system of claim 7, wherein analyzing the respective interface data comprises analyzing states of respective tax data source webpages of the first tax data source website resulting from applying the respective interface data to the first tax data source website.

10. The system of claim 3, wherein the navigation sequence detector comprises a branch detector configured to analyze first and second tax data source webpages of the first tax data source website, wherein the first and second tax data source webpages have different configurations but respective interactions on the first and second tax data source webpages result in respective first and second result webpages having the same state.

11. The system of claim 1, wherein the target classification engine is also configured to convert each of the first and second tax data source websites to respective first and second tree structures, and to perform an edit-distance computation on the first and second tree structures to determine whether the first and second tax data source websites are substantially similar to each other.

12. The system of claim 11, wherein the target classification engine is also configured to categorize the first and second tax data source websites as substantially similar when the edit-distance computation outputs a difference parameter greater than a predetermined difference parameter.

13. The system of claim 1, wherein the playback engine is also configured to enter the user information into a second field in the second tax data source website using the navigation information, wherein the second field in the second tax data source website corresponds to a first field in the first tax data source website.

14. The system of claim 1, the machine learning system further comprising a parameter detector configured to parameterize a field on the second tax data source website before the playback engine interacts with the second tax data source website.

15. The system of claim 14, wherein parameterizing the field on the second tax data source website comprises determining that the field includes a parameter.

16. The system of claim 15, wherein the parameter is selected from the group consisting of an HTTP POST request and an onblur event.

17. The system of claim 15, wherein parameterizing the field on the second tax data source website further comprises capturing the parameter.

18. The system of claim 17, wherein parameterizing the field on the second tax data source website further comprises removing the parameter from the second tax data source website before the playback engine interacts with the second tax data source website.

19. A computer-implemented method of acquiring tax data using a computerized system comprising a client computer executing a browser, a browser rendering computer in communication with the client computer, and a machine learning system utilized by the browser rendering computer, the method comprising:

the client computer presenting a tax preparation webpage of a tax preparation application utilized to prepare the electronic tax return;

the client computer receiving interface data from a first user for a first tax data source website of a tax data source program hosted by a tax data source computer, wherein the interface data represents the first user's interactions with the first tax data source website;

the browser rendering computer receiving the interface data from the client computer;

the browser rendering computer executing the machine learning system utilizing the received interface data as an input;

the browser rendering computer deriving navigation information for the first tax data source website based at least in part upon a result generated by the machine learning system;

the browser rendering computer generating rendering instructions for the first tax data source website, and transmitting the rendering instructions to the client computer; and the client computer executing the rendering instructions to implement a second browser that presents a tax data source webpage based at least in part upon the rendering instructions and the interface data, the client computer rendering the presented tax data source webpage such that the rendered tax data source webpage overlaps the tax preparation webpage, the tax data source webpage being controllable by a user independently of the tax preparation webpage, wherein the machine learning system further comprises a target classification engine and a playback engine, and said method further comprises the target classification engine determining whether a second tax data source web site is substantially similar to the first tax data source website and the playback engine interacting with the second tax data source website using the navigation information and user information provided by a second user.

20. The method of claim 19, wherein the interface data is selected from the group consisting of mouse clicks, keyboard events, form submissions, and page navigations.

21. The method of claim 19, wherein the machine learning system comprises an action recorder and a navigation sequence detector, the method further comprising:

the action recorder reading and storing the interface data; and the navigation sequence detector analyzing the interface data and deriving the navigation information for the first tax data source website.

22. The method of claim 21, further comprising the action recorder filtering out a non-relevant event.

23. The method of claim 22, wherein the non-relevant event is selected from the group consisting of mouse clicks on non-link elements and scrolling events.

24. The method of claim 21, further comprising the action recorder reading and storing respective interface data from a plurality of users on the first tax data source website.

25. The method of claim 24, further comprising the navigation sequence detector analyzing the respective interface data and deriving the navigation information for the first tax data source website.

26. The method of claim 25, wherein analyzing the respective interface data comprises the navigation sequence detector generalizing the respective interface data.

27. The method of claim 25, wherein analyzing the respective interface data comprises the navigation sequence detector analyzing states of respective tax data source webpages of the first tax data source website resulting from applying the respective interface data to the first tax data source website.

28. The method of claim 21, wherein the navigation sequence detector comprises a branch detector, the method further comprising the branch detector analyzing first and second tax data source webpages of the first tax data source website, wherein the first and second tax data source webpages have different configurations but respective interactions on the first and second tax data source webpages result in respective first and second result webpages having the same state.

29. The method of claim 19, further comprising the target classification engine converting each of the first and second tax data source websites to respective first and second tree structures, and performing an edit-distance computation on the first and second tree structures to determine whether the first and second tax data source websites are substantially similar to each other.

30. The method of claim 29, further comprising the target classification engine categorizing the first and second tax data source websites as substantially similar when the edit-distance computation outputs a difference parameter greater than a predetermined difference parameter.

31. The method of claim 19, further comprising the playback engine entering the user information into a second field in the second tax data source website using the navigation information, wherein the second field in the second tax data source website corresponds to a first field in the first tax data source website.

32. The method of claim 19, wherein the machine learning system further comprises a parameter detector, the method further comprising the parameter detector parameterizing a field on the second tax data source website before the playback engine interacts with the second tax data source website.

33. The method of claim 32, wherein parameterizing the field on the second tax data source website comprises determining that the field includes a parameter.

34. The method of claim 33, wherein the parameter is selected from the group consisting of an HTTP POST request and an onblur event.

35. The method of claim 33, wherein parameterizing the field on the second tax data source website further comprises capturing the parameter.

36. The method of claim 35, wherein parameterizing the field on the second tax data source website further comprises removing the parameter from the second tax data source website before the playback engine interacts with the second tax data source website.

* * * * *